(12) United States Patent
Nomura et al.

(10) Patent No.: US 7,188,019 B2
(45) Date of Patent: Mar. 6, 2007

(54) GAS TURBINE CONTROL APPARATUS, GAS TURBINE SYSTEM AND GAS TURBINE CONTROL METHOD

(75) Inventors: Masumi Nomura, Takasago (JP); Hiroyuki Iba, Takasago (JP); Kozo Toyama, Takasago (JP); Tomo Kawakami, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 368 days.

(21) Appl. No.: 10/929,927

(22) Filed: Aug. 31, 2004

(65) Prior Publication Data

US 2005/0107942 A1 May 19, 2005

(30) Foreign Application Priority Data

Oct. 30, 2003 (JP) ............................. 2003-370221
Jan. 15, 2004 (JP) ............................. 2004-007596

(51) Int. Cl.
*F02C 9/00* (2006.01)
*G01C 19/00* (2006.01)

(52) U.S. Cl. .................... 701/100; 701/103; 60/39.281

(58) Field of Classification Search ............... 701/100, 701/102, 103, 104, 108, 115; 60/39.281, 60/790, 773; 702/138, 184; 700/274
See application file for complete search history.

(56) References Cited

U.S. PATENT DOCUMENTS 6,205,765 B1* 3/2001 Iasillo et al. .................. 60/773
6,922,612 B2* 7/2005 Nomura et al. ............. 700/274
2002/0178730 A1* 12/2002 Ganz et al. .................... 60/773
2003/0014219 A1* 1/2003 Shimizu et al. ............. 702/184

FOREIGN PATENT DOCUMENTS

JP 2003-232230 8/2003

* cited by examiner

*Primary Examiner*—Tan Q. Nguyen
(74) *Attorney, Agent, or Firm*—Westerman, Hattori, Daniels & Adrian, LLP.

(57) ABSTRACT

A gas turbine control apparatus, etc. are provided by which combustion fluctuation, even if arising in plural frequency bands, can be effectively suppressed. If the combustion fluctuation arises in plural frequency bands, corresponding to a predetermined priority order, adjustment is done so that the combustion fluctuation of the frequency band of a high priority order is suppressed. If the gas turbine state changes after the adjustment, this is reflected on a data base 30. If no sufficient data is stored yet in the data base 30 for any the reason, such as immediately after installation of the gas turbine, correction is made using data of countermeasures based on data of another same type gas turbine contained in a basic data base 31 and data of countermeasures based on experiences of skilled adjusting operators contained in a knowledge data base 32. Also, in a stabilized operation, operation condition may be varied so that an optimal operation condition is automatically searched.

18 Claims, 17 Drawing Sheets

Fig. 8

| Time | Operational data | | Unoperable data | | First frequency band | Second frequency band | ... | n-th frequency band |
|---|---|---|---|---|---|---|---|---|
| | By-pass valve opening | Pilot ratio | Atomospheric temperature | MW | | | | |
| | Process data | | | | | | | |
| $t_1$ | $X_{11-1}$ | $X_{12-1}$ | $X_{21-1}$ | $X_{22-1}$ | $Y_{11-1}$ | $Y_{12-1}$ | ... | $Y_{1n-1}$ |
| $t_2$ | $X_{11-2}$ | $X_{12-2}$ | $X_{21-2}$ | $X_{22-2}$ | $Y_{11-2}$ | $Y_{12-2}$ | ... | $Y_{1n-2}$ |
| ... | ... | ... | ... | ... | ... | ... | ... | ... |
| $t_n$ | $X_{11-n}$ | $X_{12-n}$ | $X_{21-n}$ | $X_{22-n}$ | $Y_{11-n}$ | $Y_{12-n}$ | ... | $Y_{1n-n}$ |

Fig. 11

|  | First frequency band | | ... | n-th frequency band | |
|---|---|---|---|---|---|
| First priority | By-pass valve | To open | ... | Pilot ratio | To decrease |
| Second priority | Pilot ratio | To increase | ... | — | — |

By-pass valve opening

By-pass valve opening

GAS TURBINE CONTROL APPARATUS, GAS TURBINE SYSTEM AND GAS TURBINE CONTROL METHOD

BACKGROUND OF THE INVENTION

1. Field of the Invention

The present invention relates to a gas turbine control apparatus by which combustion fluctuation is controlled to be suppressed and also relates to a gas turbine system using the gas turbine control apparatus and a gas turbine control method based on the same concept.

2. Description of the Prior Art

In a prior art gas turbine, flow rates of air and fuel to be supplied into a combustor are decided in advance based on a generator output, atmospheric temperature and humidity, etc. and by using the values thereof, operation of the gas turbine is carried out. However, due to aged deterioration, such as deterioration of a compressor performance, clogging of a filter, or the like, there is a possibility that the actual flow rates of fuel and air deviate from planned values or adjusted values of the trial operation time. In this case, there is a possibility that the combustion stability is deteriorated or combustion fluctuation arises. If combustion fluctuation arises, operation of the gas turbine may be largely obstructed. That is, from the viewpoint of preservation of the plant facilities and enhancement of the availability of the plant, to suppress and avoid the combustion fluctuation to the extent possible is strongly desired. Thus, in order to maintain the combustion stability and avoid the combustion fluctuation, adjustments of the control system are carried out several times a year by skilled operators so that the combustion stability is confirmed and maintained and this invites an increase of the maintenance cost and a deterioration of the availability.

Patent Document 1 (the Japanese laid-open patent application 1997-269107) discloses a combustion fluctuation suppressing device of a combustor and a method thereof.

This combustion fluctuation suppressing device of a combustor comprises a combustion fluctuation suppressing portion. This combustion fluctuation suppressing portion comprises a frequency analyzing device performing a frequency analysis of pressure fluctuation of combustion gas detected by a pressure sensor in the combustor, a central computing and processing unit processing a fluctuation stability based on frequency bands of the pressure fluctuation analyzed by the frequency analyzing device, a voltage amplifier amplifying an output signal of the central computing and processing unit and a controlling portion performing a control by giving the amplified output signal as a valve opening and closing signal into a fuel valve.

This fluctuation suppressing method puts eyes on the low frequency combustion fluctuation. That is, based on a fuel-air ratio at the time of occurrence of the combustion fluctuation, the frequency of the combustion fluctuation is predicted. In case of the low frequency combustion fluctuation, by changing the fuel-air ratio, occurrence of the low frequency combustion fluctuation can be suppressed. As the low frequency combustion fluctuation is liable to give influences on the machine parts and components, by suppressing the low frequency combustion fluctuation, damages of the machine parts and components are suppressed.

However, the combustion fluctuation suppressing method of the Patent Document 1 relates to the low frequency combustion fluctuation, as mentioned above. Actually, the combustion fluctuation arising in the gas turbine can be caused in a wide range of frequency bands from a low frequency to a high frequency of several thousands Hz for various reasons. Moreover, the combustion fluctuation may arise simultaneously in a plurality of frequency bands. If the fuel-air ratio is changed based on the combustion fluctuation of the low frequency band only, there may be a bad influence on the combustion fluctuation of other frequency bands.

In this way, by simply suppressing the combustion fluctuation only of the low frequency, it is difficult to effectively realize a stability of the combustion.

By the way, the combustion fluctuation suppressing means is usually such one as to carry out the control so as to avoid the combustion fluctuation just after the combustion fluctuation has arisen. Hence, even if a steady operation having no combustion fluctuation is being carried out, as various combustion fluctuation suppressing means are used therein, such steady state may include a state of the boundary that the combustion fluctuation almost arises.

Also, corresponding to the change in the air temperature or humitity due to the seasonal variation or corresponding to the deterioration or deformation of each of the gas turbine parts and components due to aged deterioration, etc., even if the outside condition, such as the air temperature or humidity, is the same, the combustion state does not always become the same.

Moreover, such a state that a steady operation without the combustion fluctuation is carried out may not always be the best from the economical point of view, etc. For example, in Patent Document 2 (the Japanese laid-open patent application 2003-232230), in order to suppress emissions of nitrogen oxides discharged from a combustor to a target level, to control fuel to be supplied into each of plural combustors is carried out. In this way, it is preferable to carry out the control of the gas turbine operation based on the conditions balanced from various points of view including not only suppressing the combustion fluctuation but also suppressing the emissions, etc.

In the present situation, however, in the control of the gas turbine operation, there is still a large room for enhancing the stability, economy of operation, environment preservation performance, etc.

SUMMARY OF THE INVENTION

In view of the technical problems as mentioned above, it is an object of the present invention to provide a gas turbine control apparatus, etc. by which combustion fluctuation can be effectively suppressed even if the combustion fluctuation arises in a plurality of frequency bands.

It is another object of the present invention to provide a gas turbine control apparatus, etc. by which an operation excellent in the stability, economy of operation and environment preservation performance can be carried out while the combustion fluctuation is being suppressed.

With the above-mentioned objects in mind, the inventors here have carried out extensive studies and presented a plurality of proposals including Patent Documents 3 to 5 (that is, the Japanese laid-open patent applications 2002-47945, 2002-54460 and 2003-65082).

In these proposals, in order to realize a combustion stability, the following means are disclosed, that is, a frequency analysis is carried out on the pressure fluctuation in the gas turbine combustor and the result of this analysis is divided into a plurality of frequency bands so that, in the frequency bands in which the combustion fluctuation is a threshold or higher than that, adjustment of the fuel-air ratio is carried out so as to suppress the combustion fluctuation, or based on the data obtained, a formula model is established so that an area in which the combustion fluctuation is liable to arise is predicted.

Based on these proposals as heretofore made, the present invention aims further improvements by providing the following means:

A gas turbine control apparatus according to the present invention is characterized in comprising: a frequency analyzing portion carrying out a frequency analysis of fluctuation of pressure or acceleration in a combustor of a gas turbine and putting out an analysis result divided into frequency bands in which the result of the frequency analysis is divided into a plurality of frequency bands, a priority order information containing portion containing information on a priority order set for the plurality of frequency bands, a combustion characteristic grasping portion grasping a characteristic of combustion fluctuation of the gas turbine, based on the analysis result divided into frequency bands and process data of the gas turbine, and a control portion adjusting at least one of a flow rate of fuel and a flow rate of air to be supplied into the combustor so that the combustion fluctuation of a frequency band of a high priority order is suppressed, based on the information on the priority order contained in the priority order information containing portion, when the combustion characteristic grasping portion grasps that the combustion fluctuation arises in a plurality of frequency bands.

Thereby, even when the combustion fluctuation arises in a plurality of frequency bands, the adjustment is carried out so that the combustion fluctuation of the frequency band of the high priority order is suppressed and the combustion fluctuation having a high risk or high possibility of obstacles can be effectively suppressed.

It is preferable that, when the control portion makes the adjustment, the control portion stores in a data base contents of the adjustment and information related with changes in a combustion state in the combustor as the result of the adjustment. If the data so stored is reflected on the contents of the adjustment at the control portion, this gas turbine control apparatus can have a learning function.

Also, in case where information, such as a formula model showing a standard combustion characteristic or a restrictive information for operation of the gas turbine, is obtained by an analysis based on the information stored in the data base in another gas turbine, the gas turbine control apparatus of the present invention may further comprise a basic data base in which the information, such as the formula model or the restrictive information, is contained. In this case, the control portion adjusts at least one of the flow rate of fuel and the flow rate of air to be supplied into the combustor, based on the information, such as the formula model or the restrictive information, contained in the basic data base. Also, if a table or data base is prepared in advance containing such information as "such and such adjustments for such and such cases" based on experiences of skilled adjusting operators, then it is also very effective to do the control based on such information. It is preferable that the change in the combustion state in the combustor as the result of the adjustment made based on the experiences of the skilled adjusting operators is also stored in the data base, as mentioned above. Thereby, the information based on the experiences of the skilled adjusting operators is additionally stored and a reliability of the control can be further enhanced.

In case an abnormality is found in the gas turbine itself, even if the combustion fluctuation is detected, the fluctuation may be caused by the abnormality of the gas turbine itself other than the combustion. In this case, it is more important that countermeasures are taken for the abnormality of the gas turbine rather than suppressing the combustion fluctuation. For this purpose, the gas turbine control apparatus may further comprise a turbine abnormality detecting portion detecting an abnormality of the gas turbine and, when the turbine abnormality detecting portion detects an abnormality of the gas turbine, the control portion may carry out no adjustment but notify outside that there arises the abnormality.

Also, if there arises an abnormality of a sensor detecting the fluctuation of pressure or acceleration in the combustor, even if there is actually no combustion fluctuation, judgement may be done as if there is the combustion fluctuation. Thus, when the sensor abnormality detecting portion detects an abnormality of the sensor, the control portion may carry out no adjustment but notify outside that there arises the abnormality. Or, otherwise, a plurality of sets of sensors are provided and the result of the detection of the sensor in which the abnormality arises can be neglected.

Also, if the fuel to be supplied into the combustor is stored in a tank or the like, a composition of the fuel may differ between an upper portion and a lower portion of the tank according to the specific gravity of the substances constituting the fuel. Thus, it is preferable that, based on the composition of the fuel to be supplied into the combustor, the control portion corrects contents of the adjustment made for at least one of the flow rate of fuel and the flow rate of air to be supplied into the combustor.

The present invention also provides a gas turbine system comprising the gas turbine control apparatus as mentioned above. That is, a gas turbine system according to the present invention is characterized in comprising: a gas turbine containing a combustor, a frequency analyzing portion carrying out a frequency analysis of fluctuation of pressure or acceleration in the combustor and putting out an analysis result divided into frequency bands in which the result of the frequency analysis is divided into a plurality of frequency bands, a priority order information containing portion containing information on a priority order set for the plurality of frequency bands, a combustion characteristic grasping portion grasping a characteristic of combustion fluctuation of the gas turbine, based on the analysis result divided into frequency bands and process data of the gas turbine, and a control portion adjusting at least one of a flow rate of fuel and a flow rate of air to be supplied into the combustor so that the combustion fluctuation of a frequency band of a high priority order is suppressed, based on the information on the priority order contained in the priority order information containing portion, when the combustion characteristic grasping portion grasps that the combustion fluctuation arises in a plurality of frequency bands.

The present invention also provides a gas turbine control method characterized in comprising: a step of carrying out a frequency analysis-of fluctuation of pressure or acceleration in a combustor of a gas turbine and putting out an analysis result divided into frequency bands in which the result of the frequency analysis is divided into a plurality of frequency bands, a step of grasping a characteristic of combustion fluctuation of the gas turbine, based on the analysis result divided into frequency bands and process data of the gas turbine, and a step of adjusting at least one of a flow rate of fuel and a flow rate of air to be supplied into the combustor so that the-combustion fluctuation of a frequency band of a high priority order is suppressed, based on a predetermined priority order, when the combustion fluctuation arises in a plurality of frequency bands.

Further, the present invention provides a gas turbine control apparatus, that is characterized in comprising: a frequency analyzing portion carrying out a frequency analysis of fluctuation of pressure or acceleration in a combustor of a gas turbine and putting out an analysis result divided into frequency bands in which the result of the frequency analysis is divided into a plurality of frequency bands, a combustion characteristic grasping portion grasping a characteristic of combustion fluctuation of the gas turbine, based on the analysis result divided into frequency bands and process data of the gas turbine, a control portion adjusting at least one of a flow rate of fuel and a flow rate of air to be supplied into the combustor so that the combustion fluctuation is suppressed, when the combustion characteristic grasping portion grasps that the combustion fluctuation arises, and a search and control portion searching an optimal operation condition by varying at least one of the flow rate of fuel and the flow rate of air to be supplied into the combustor in the state that the control portion is not carrying out an adjustment to suppress the combustion fluctuation and, corresponding to the optimal operation condition obtained, adjusting at least one of the flow rate of fuel and the flow rate of air to be supplied into the combustor.

In this way, in the state that no adjustment is being carried out for suppressing the combustion fluctuation, that is, in a stabilized state, by varying at least one of the flow rate of fuel and the flow rate of air to be supplied into the combustor, an optimal operation condition can be searched. And corresponding to the optimal operation condition obtained, the adjustment is made for at least one of the flow rate of fuel and the flow rate of air to be supplied into the combustor and thereby not only a simply stabilized operation condition but also a better operation condition can be obtained. At this time, the search and control portion may decide the optimal operation condition as an operation condition in which a stability against the combustion fluctuation is highest. Also, the search and control portion may search the optimal operation condition by evaluating a thermal efficiency of the gas turbine in addition to the stability against the combustion fluctuation.

The search and control portion may vary at least one of the flow rate of fuel and the flow rate of air to be supplied into the combustor based on a predetermined profile. Also, when the search and control portion varies at least one of the flow rate of fuel and the flow rate of air to be supplied into the combustor based on the profile, the search and control portion may predict whether the combustion fluctuation may arise or not and, if it is so predicted that the combustion fluctuation may arise, the search and control portion may stop to vary at least one of the flow rate of fuel and the flow rate of air to be supplied into the combustor. Further, if the combustion fluctuation arises as the result of the search and control portion varying at least one of the flow rate of fuel and the flow rate of air to be supplied into the combustor, the search and control portion may stop to vary at least one of the flow rate of fuel and the flow rate of air to be supplied into the combustor.

The combustion fluctuation may arise as the result of the search and control portion varying at least one of the flow rate of fuel and the flow rate of air to be supplied into the combustor. In this case, it is preferable that the control portion adjusts at least one of the flow rate of fuel and the flow rate of air to be supplied into the combustor so that the combustion fluctuation is suppressed.

Also, the present invention provides a gas turbine system, that is characterized in comprising: a gas turbine containing a combustor and a search and control portion searching an optimal operation condition by varying at least one of a flow rate of fuel and a flow rate of air to be supplied into the combustor in the state that there is no combustion fluctuation in the gas turbine and, corresponding to the optimal operation condition obtained, adjusting at least one of the flow rate of fuel and the flow rate of air to be supplied into the combustor.

The search and control portion may search an optimal operation condition at the time of start or stop of the gas turbine by varying at least one of the flow rate of fuel and the flow rate of air to be supplied into the combustor on each time of the start or stop of the gas turbine as well as by carrying out the start or stop with a plurality of times.

Moreover, the present invention provides a gas turbine control method, that is characterized in comprising: a result putting out step carrying out a frequency analysis of fluctuation of pressure or acceleration in a combustor of a gas turbine and putting out an analysis result thereof, a characteristic grasping step grasping a characteristic of combustion fluctuation of the gas turbine, based on the analysis result and process data of the gas turbine, a fluctuation suppressing step adjusting at least one of a flow rate of fuel and a flow rate of air to be supplied into the combustor so that the combustion fluctuation is suppressed, if the combustion fluctuation arises as the result of the characteristic grasping step grasping the characteristic of the combustion fluctuation of the gas turbine, and a condition searching step searching an optimal operation condition by varying at least one of the flow rate of fuel and the flow rate of air to be supplied into the combustor in the state that the fluctuation suppressing step is not being carried out and, corresponding to the optimal operation condition obtained, adjusting at least one of the flow rate of fuel and the flow rate of air to be supplied into the combustor.

According to the present invention, even if there arises a combustion fluctuation in a plurality of frequency bands, the combustion fluctuation can be effectively suppressed and an always excellent combustion state can be maintained.

Also, according to the present invention, a search of the operation condition in a stabilized state is automatically carried out and thereby an operation excellent in the stability as well as in the economy of operation and environment preservation performance becomes possible.

BRIEF DESCRIPTION OF THE DRAWINGS

FIG. 8 is a view showing one example of data obtained at each of predetermined times.

FIG. 11 is a view showing one example of a countermeasures priority order set for each of frequency bands.

FIG. 15 comprises FIGS. 15(a) to (c), wherein FIG. 15(a) is a view showing an example of variation sequences of an operation condition in case a condition search is carried out, FIG. 15(b) is a view showing an example of a gas turbine operation schedule before the operation condition is varied and FIG. 15(c) is a view showing an example of a gas turbine operation schedule of an optimal operation condition obtained as the result of the condition search.

FIG. 16 comprises FIGS. 16(a) and (b), wherein FIG. 16(a) is a view showing an example of an area in which the condition search is carried out and FIG. 16(b) is a view showing an example in which the area for the condition search is slid because of occurrence of the combustion fluctuation during the condition search.

DESCRIPTION OF THE PREFERRED EMBODIMENTS

Herebelow, the present invention will be described more concretely based on embodiments of a gas turbine control apparatus and a gas turbine system according to the present invention with reference to the appended drawings.

In the present embodiment, while an example of a control apparatus used in a gas turbine is described, this control apparatus is also applicable to a control of other combustion devices in which combustion fluctuation may arise.

Figure 1:
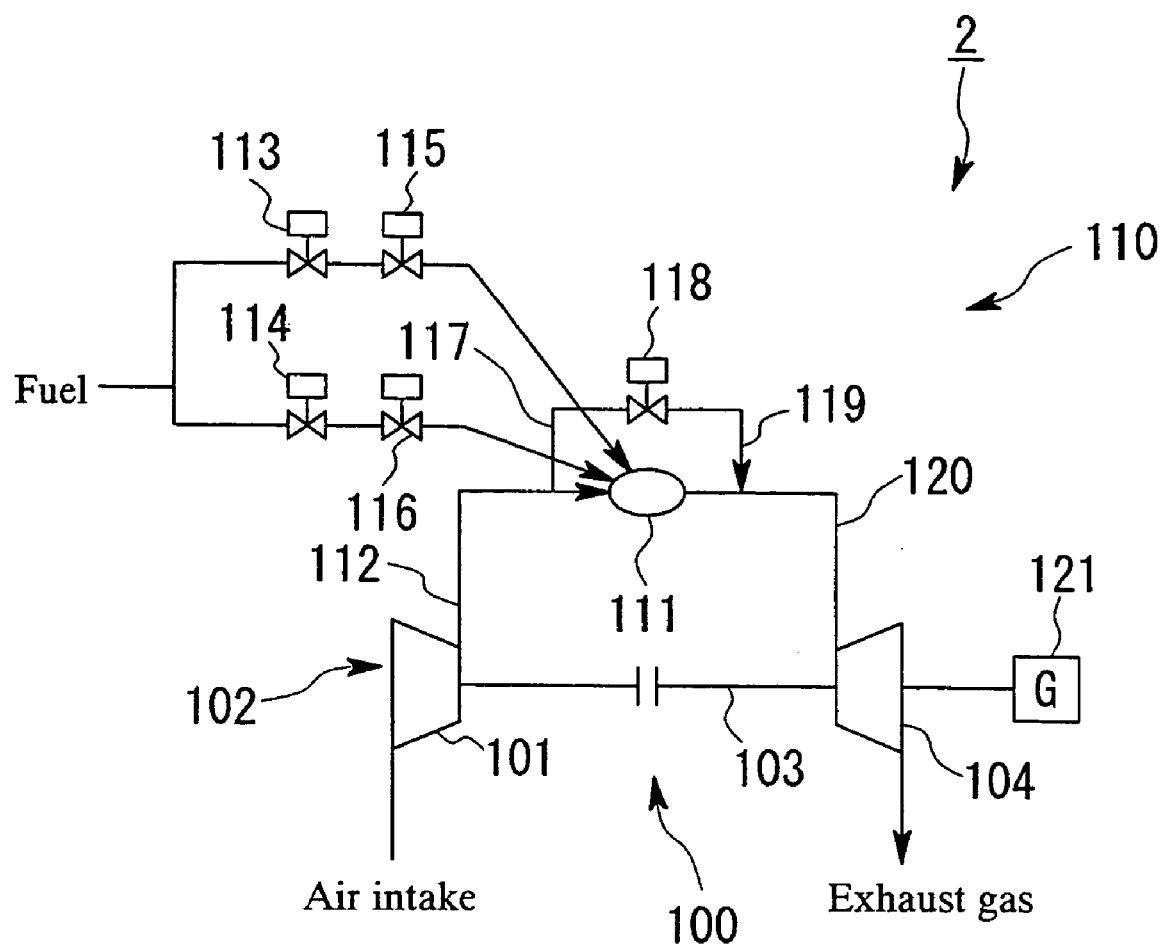
FIG. 1 is a view showing a construction of a gas turbine as a part of an embodiment according to the present invention.

With reference to FIG. 1, a gas turbine 2 in which a gas turbine control apparatus and a gas turbine system of the present invention are used will be described.

FIG. 1 shows a schematic construction of the gas turbine 2. This gas turbine 2 comprises a gas turbine body portion 100 and a combustion portion 110 having a combustor 111.

The gas turbine body portion 100 comprises a compressor 101 containing an inlet guide vane 102, a rotating shaft 103 and a turbine 104 to which a generator 121 is connected.

The turbine 104 is connected on one side with a combustion gas supply pipe 120 and on the other side with a piping through which combustion gas is discharged outside. Also, the turbine 104 is jointed on one side with the compressor 101 and on the other side with the generator 121 both via the rotating shaft 103. The turbine 104 is supplied with the combustion gas from the combustor 111 via the combustion gas supply pipe 120 so that an energy of the combustion gas is converted into a rotational energy effecting a rotation. By this rotation, the generator 121 and the compressor 101 are rotated. The combustion gas after used for the power generation is discharged outside.

The compressor 101 is connected on one side with a piping through which outside air is taken in and on the other side with a compressed air supply portion 112. The compressor 101, being jointed with the turbine 104 and the generator 121 via the rotating shaft 103, as mentioned above, is rotated being transmitted with the rotation of the turbine 104 and, by this rotation, the outside air is taken into the compressor 101 to be compressed and supplied into the combustor 111 via the compressed air supply portion 112.

The inlet guide vane 102 is a rotating vane provided on the air intake side of the compressor 101. By controlling the angle of the rotating vane of the inlet guide vane 102, even if the rotational speed is constant, flow rate of the air taken into the compressor 101 can be adjusted. Control of the rotating vane is carried out by a gas turbine control portion 3, as will be described later.

The rotating shaft 103 is connected with the compressor 101, the turbine 104 and the generator 121 so that the rotational force of the turbine 104 is transmitted to the compressor 101 and the generator 121. The generator 121 is connected with the turbine 104 via the rotating shaft 103 so that the rotational energy of the turbine 104 is converted into an electric energy.

The combustion portion 110 comprises, in addition to the combustor 111, the compressed air supply portion 112 and the combustion gas supply pipe 120, a by-pass air supply pipe 117, a by-pass valve 118, a by-pass air mixing pipe 119, a main fuel flow control valve 113, a pilot fuel flow control valve 114, a main fuel supply valve 115 and a pilot fuel supply valve 116.

The compressed air supply portion 112 comprises a compressed air supply pipe connected to the compressor 101, a space into which air in a casing (turbine casing) of the combustion portion 110 is supplied and the like, so that compressor outlet air compressed at the compressor 101 is supplied into the combustor 111 through the compressed air supply portion 112.

The by-pass air supply pipe 117 is a pipe having its one end opened into, and connected to, the compressed air supply portion 112 and the other end connected to the by-pass valve 118, so that the portion that is not supplied into the combustor 111 out of the compressor outlet air flows through the by-pass air supply pipe 117, by-passing the combustor 111, to be supplied into the turbine 104.

The by-pass valve 118 has its inlet connected to the by-pass air supply pipe 117 and its outlet connected to the by-pass air mixing pipe 119, so that the flow rate of the air flowing through the by-pass air supply pipe 117 is controlled by the by-pass valve 118. Control of the air flow rate is carried out by the gas turbine control portion 3 (to be described later).

The by-pass air mixing pipe 119 has its one end connected to the by-pass valve 118 and the other end connected to the combustion gas supply pipe 120, so that the air having passed through the by-pass valve 118 is supplied into the combustion gas supply pipe 120 through the by-pass air mixing pipe 119 to be mixed with the combustion gas generated in the combustor 111.

The main fuel flow control valve 113 has its inlet connected to a piping through which outside fuel is supplied and its outlet connected to a piping connecting to a plurality of the main fuel supply valves 115, so that flow rate of the fuel supplied into the combustor 111 from outside is controlled by the main fuel flow control valve 113. Control of the fuel flow rate is carried out by the gas turbine control portion 3. The fuel supplied through the main fuel flow control valve 113 is used in a main burner of the combustor 111.

Each of the main fuel supply valves 115 has its inlet connected to a piping connecting to the main fuel flow control valve 113 and its outlet connected to a piping connecting to the main burner of the combustor 111, so that the fuel supplied into the main burner of the combustor 111 is controlled by the main fuel supply valve 115. Control of the fuel flow rate is carried out by the gas turbine control portion 3.

The pilot fuel flow control valve 114 has its inlet connected to a piping through which outside fuel is supplied and its outlet connected to a piping connecting to a plurality of the pilot fuel supply valves 116, so that flow rate of the fuel supplied into the combustor 111 from outside is controlled by the pilot fuel flow control valve 114. Control of the fuel flow rate is carried out by the gas turbine control portion 3. The fuel supplied through the pilot fuel flow control valve 114 is used in a pilot burner of the combustor 111.

Each of the pilot fuel supply valves 116 has its inlet connected to a piping connecting to the pilot fuel flow control valve 114 and its outlet connected to a piping connecting to the pilot burner of the combustor 111, so that the fuel supplied into the pilot burner of the combustor 111 is controlled by the pilot fuel supply valve 116. Control of the fuel flow rate is carried out by the gas turbine control portion 3.

The combustor 111 is connected with the compressed air supply portion 112 through which air is supplied, the piping connecting to the main fuel supply valve 115 through which fuel is supplied, the piping connecting to the pilot fuel supply valve 116 through which fuel is supplied and the combustion gas supply pipe 120 from which combustion gas is sent out, so that the combustor 111, supplied with the air and fuel, burns them to generate a high temperature, high pressure combustion gas. The combustion gas so generated is sent out to the turbine 104.

The combustion gas supply pipe 120 has its one end connected to the combustor 111 and the other end connected to the turbine 104 and also has its mid portion jointed with the by-pass air mixing pipe 119, so that the combustion gas and by-pass air are supplied into the turbine through the combustion gas supply pipe 120.

The above-mentioned combustion portion 110 comprises a plurality (in the number of m) of the combustors 111. Here, in case of a common description of all the plurality of combustors 111-1 to m, the combustors are simply referred to as the combustor 11 and in case of a description of the individual combustor, that combustor is referred to as the combustor 111-1 (this means the first combustor), for example. The same applies also to the constructional parts and components of the combustor 111, that is, the by-pass air supply pipe 117, the by-pass valve 118, the by-pass air mixing pipe 119, the combustion gas supply pipe 120, the main fuel supply valve 115 and the pilot fuel supply valve 116.

In the gas turbine 2 constructed as mentioned above, the air introduced from outside is compressed by the compressor 101 to be supplied into the combustor 111. A portion of the fuel is supplied to the pilot fuel supply valve 116 of the combustor 111 via the pilot fuel flow control valve 114 to be introduced into the combustor 111. Also, the remaining fuel is supplied to the main fuel supply valve 115 of the combustor 111 via the main fuel flow control valve 113 to be introduced into the combustor 111. The air and fuel so introduced into the combustor 111 burn there. The combustion gas generated by the combustion is introduced into the turbine 104 to rotate the generator 121 and, by this rotational energy, electricity is generated.

A gas turbine system 1 of the present embodiment comprises the gas turbine 2 and the gas turbine control portion 3 controlling the gas turbine 2.

Figure 2:
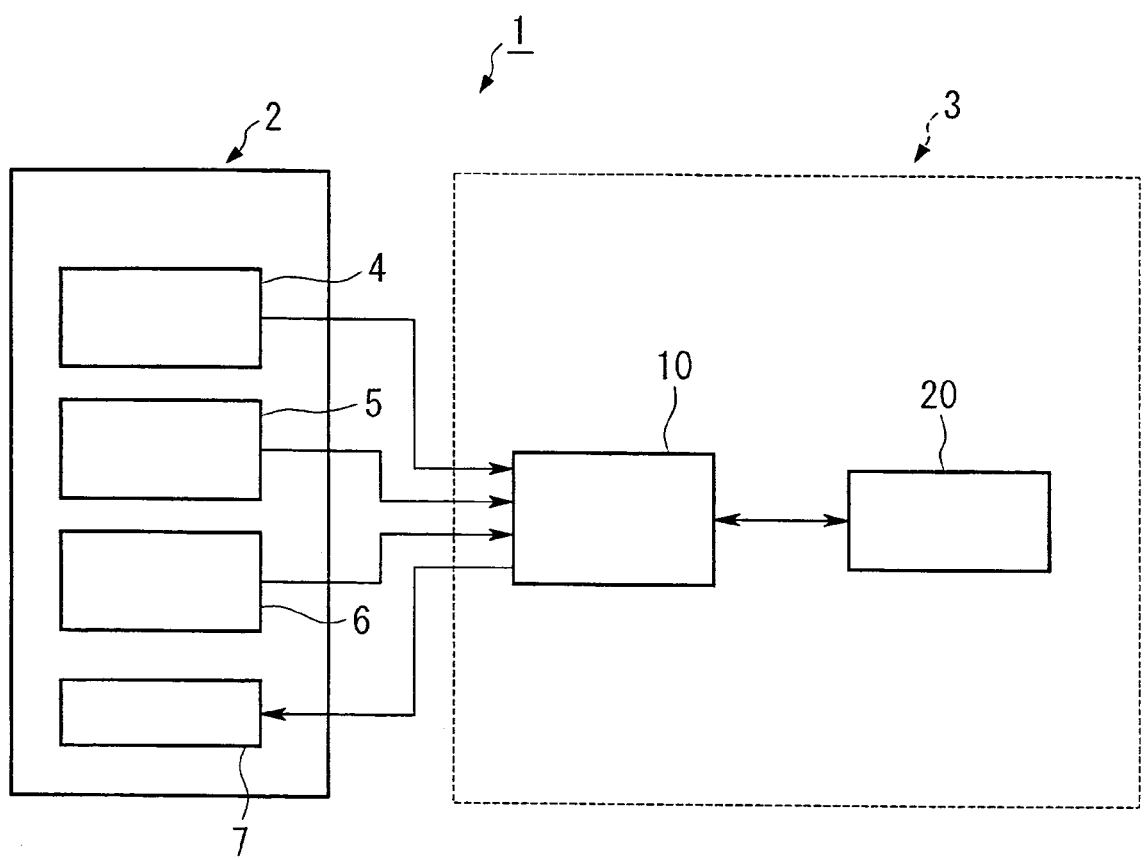
FIG. 2 is a view showing a construction of a gas turbine system according to the present invention.

FIG. 2 is a block diagram explaining a functional construction for controlling the gas turbine 2 by the gas turbine control portion 3.

Here, in order to control the gas turbine 2 by the gas turbine control portion 3, the gas turbine 2 comprises a process data measuring portion 4, a pressure fluctuation measuring portion (sensor) 5, an acceleration measuring portion (sensor) 6 and an operating mechanism 7.

The process data measuring portion 4 comprises various measuring instruments that measure process data of an operation condition or an operation state during the operation of the gas turbine 2. The process data measuring portion 4 is installed on a predetermined position of the gas turbine 2 and the result of the measurements is put out to a control unit 10 (to be described below) of the gas turbine control portion 3 at each of predetermined times $t_1, t_2, \ldots$. Here, the process data (plant state data) includes, for example, a generated power (generated current, generated voltage), atmospheric temperature and humidity, fuel flow rate and gas pressure at each part, air flow rate and pressure at each part, combustion gas temperature at the combustor 111, combustion gas flow rate, combustion gas pressure, rotational speed of the compressor 101 and the turbine 104, density of emitted substances of nitrogen oxides (NOx), carbon monoxide (CO) or the like contained in the exhaust gas of the turbine 104, etc. Here, the process data measuring portion 4 measures not only operational data that are operable, such as a quantity of fuel or air supplied into the gas turbine 2, etc., but also non-operable state data that are non-operable, such as meteorological data of atmospheric temperature or the like, a size of load of the generator that is decided by the demand (MW), etc. It is to be noted that, in the present embodiment, the term "process data" includes the operational data (plant data) and the non-operable state data.

The pressure fluctuation measuring portion 5 comprises a pressure measuring device fitted to each of the combustors 111-1 to m. The pressure fluctuation measuring portion 5 measures a pressure fluctuation occurring in each of the combustors 111-1 to m by the combustion and puts out a measured value thereof to the gas turbine control portion 3 upon a command from the control unit 10 at each of the predetermined times $t_1, t_2, \ldots$.

The acceleration measuring portion 6 comprises an acceleration measuring device fitted to each of the combustors 111-1 to m. The acceleration measuring portion 6 measures an acceleration (second-order differential of position) occurring in each of the combustors 111-1 to m by the combustion and puts out a measured value thereof to the gas turbine control portion 3 upon a command from the control unit 10 at each of the predetermined times $t_1, t_2, \ldots$.

The operating mechanism 7 comprises a mechanism to operate openings of the main fuel flow control valve 113 and each of the main fuel supply valves 115-1 to m by a command from the control unit 10 so that a flow control of main fuel is carried out. The flow control of the entire main fuel is carried out by adjusting the main fuel flow control valve 113 and the flow control of the main fuel of each of the combustors 111-1 to m is carried out by adjusting each of the main fuel supply valves 115-1 to m.

Also, the operating mechanism 7 comprises a mechanism to operate openings of the pilot fuel flow control valve 114 and each of the pilot fuel supply valves 116-1 to m by a command from the control unit 10 so that a flow control of pilot fuel is carried out. The flow control of the entire pilot fuel is carried out by adjusting the pilot fuel flow control valve 114 and the flow control of the pilot fuel of each of the combustors 111-1 to m is carried out by adjusting each of the pilot fuel supply valves 116-1 to m.

Also, the operating mechanism 7 operates an opening of each of the by-pass valves 118-1 to m by a command from the control unit 10 so that a flow control of the air supplied into each of the combustors 111-1 to m is carried out. Concretely, in each of the combustors 111-1 to m, the opening of each of the by-pass valves 118-1 to m is made larger (or smaller) so that the flow rate of the air flowing to the by-pass side is increased (or reduced) and thereby the flow rate of the air supplied into each of the combustors 111-1 to m is controlled.

Further, the operating mechanism 7 operates an opening of a rotating vane of the inlet guide vane 102 by a command from the control unit 10 so that a flow rate of the air supplied into the compressor 101 is carried out.

The gas turbine control portion 3 comprises the control unit 10 and an automatic adjusting portion (search and control portion) 20. The control unit 10 receives the measured values put out from the process data measuring portion 4, the pressure fluctuation measuring portion 5 and the acceleration measuring portion 6 and transfers the same to the automatic adjusting portion 20. Also, upon a command from the automatic adjusting portion 20, the control unit 10 puts out signals by which the operating mechanism 7 operates the main fuel flow control valve 113 as well as the main fuel supply valve 115, the pilot fuel flow control valve 114 as well as the pilot fuel supply valve 116, the by-pass valve 118 and the inlet guide vane 102.

Figure 3:
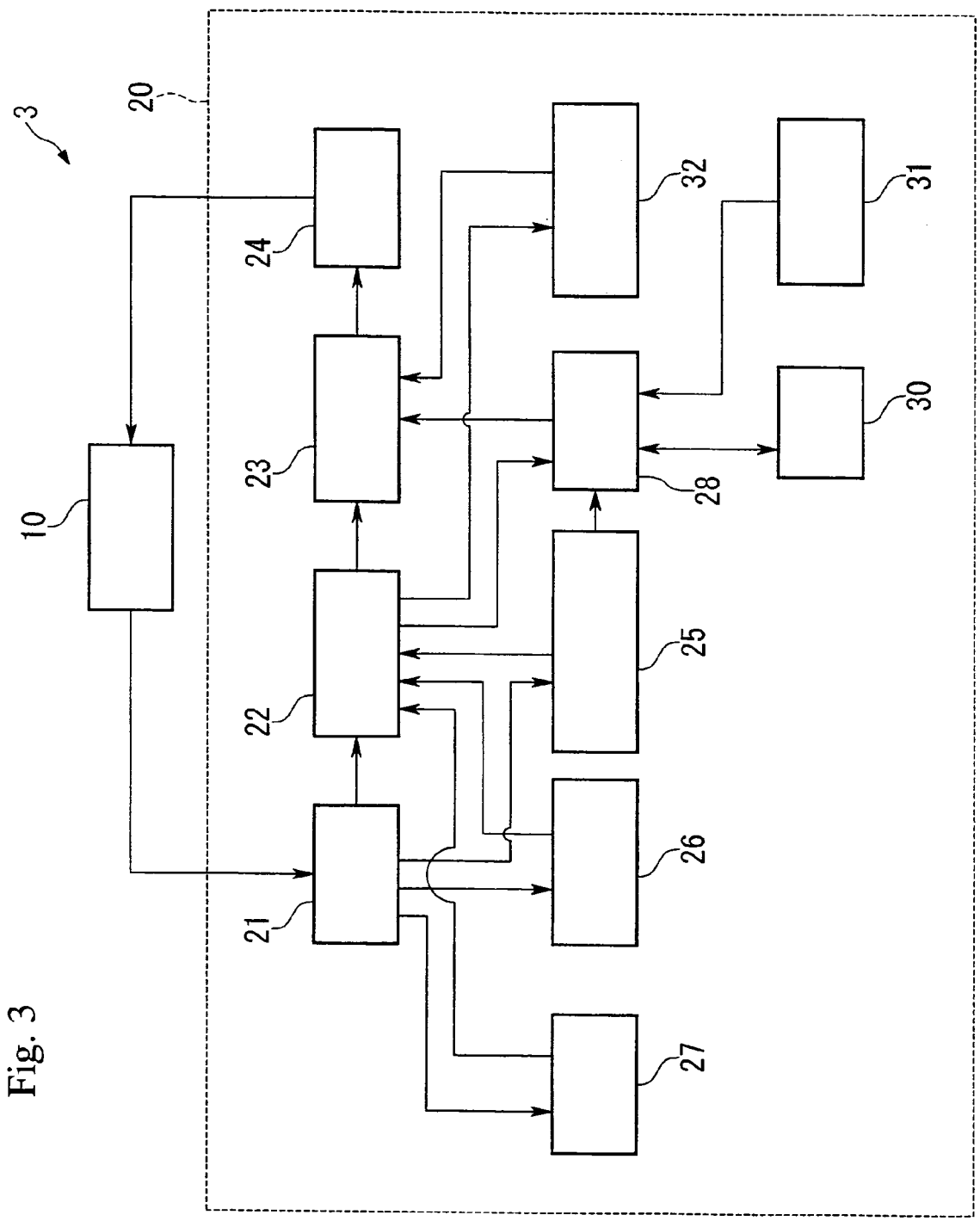
FIG. 3 is a view showing a functional construction of a gas turbine control portion.

As shown in FIG. 3, the automatic adjusting portion 20 is constructed comprising functionally an input portion 21, a state grasping portion 22, a measures deciding portion 23, an output portion 24, a frequency analyzing and sensor abnormality diagnosing portion (frequency analyzing portion and sensor abnormality detecting portion) 25, a gas turbine abnormality diagnosing portion (turbine abnormality detecting portion) 26, a fuel characteristic grasping portion 27, a fuel characteristic grasping portion 28, a data base 30, a basic data base (priority order information containing portion) 31 and a knowledge data base 32.

When the combustion fluctuation arises, the automatic adjusting portion 20 carries out a control so as to change the operational data (process data) toward the most effective direction to suppress the fluctuation.

The input portion 21 of the automatic adjusting portion 20 receives the process data of pressure or acceleration put out from the process data measuring portion 4, the pressure fluctuation measuring portion 5 and the acceleration measuring portion 6 and transferred from the control unit 10. The state grasping portion 22 grasps the state or the like of the gas turbine 2 and the combustion characteristic grasping portion 28 grasps the combustion characteristic of each of the combustors 111-1 to m. Based on the contents of the state grasped by the state grasping portion 22 and the combustion characteristic grasping portion 28, the measures deciding portion 23 decides countermeasures not to cause the combustion fluctuation in the gas turbine 2, that is, whether the main fuel flow control valve 113 as well as the main fuel supply valve 115, the pilot fuel flow control valve 114 as well as the pilot fuel supply valve 116, the by-pass valve 118 and the inlet guide vane 102 are to be adjusted or not and, if to be adjusted, decides what is the position to be adjusted and what is the adjusting quantity. The output portion 24 puts out to the control unit 10 a signal corresponding to the decision of the measures deciding portion 23.

A function of the automatic adjusting portion 20 as mentioned above will be described based on the flow of process steps actually carried out.

Figure 4:
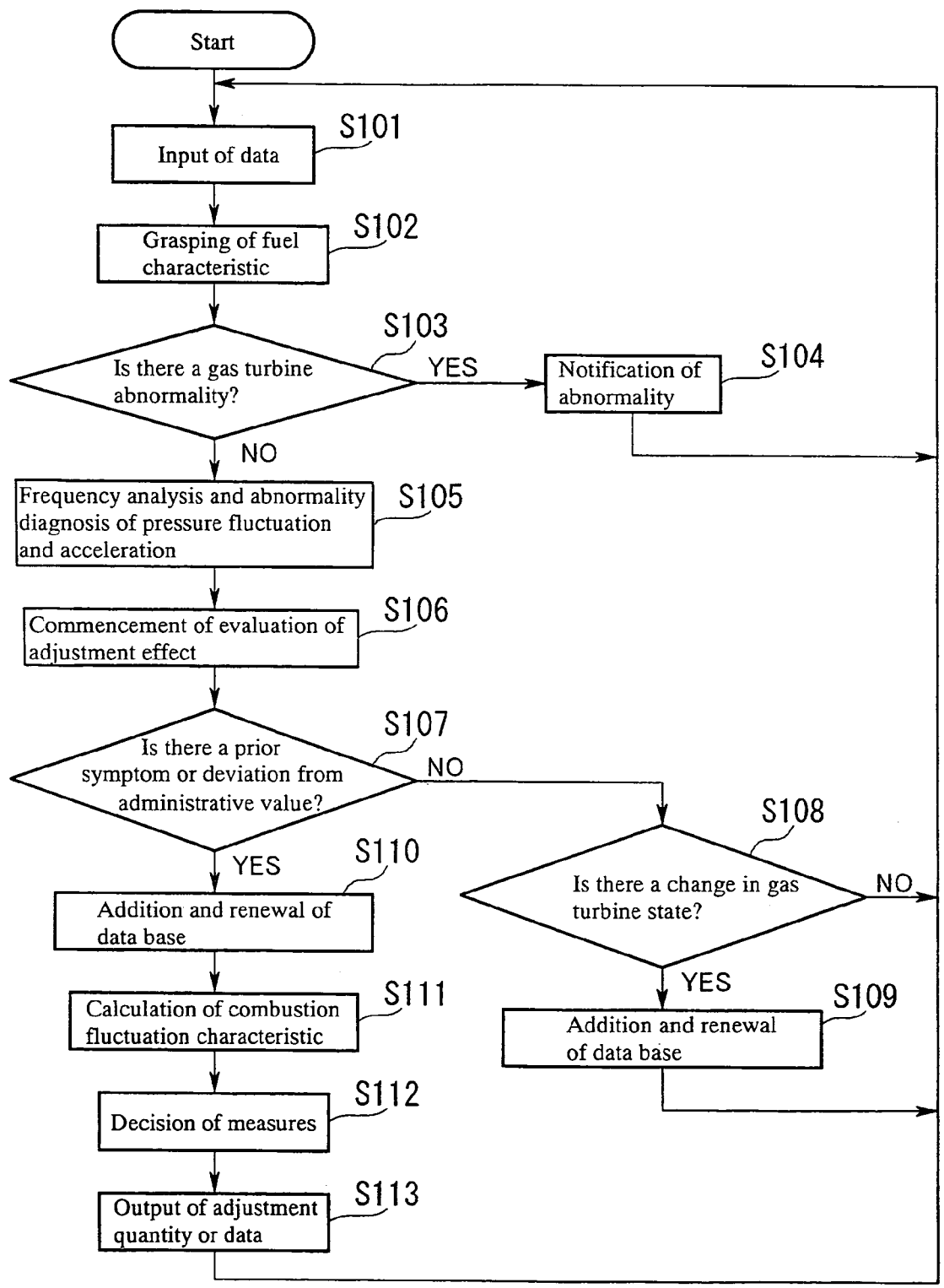
FIG. 4 is a view showing a flow of processing carried out in an automatic adjusting portion.

FIG. 4 is a view showing the flow of process steps to realize the function of the automatic adjusting portion 20 that is carried out based on the program introduced in advance in the gas turbine control portion 3. These process steps are incorporated as a portion of the program to operate the gas turbine 2 and, while the gas turbine 2 is being operated, the series of these steps are carried out at each of predetermined times.

First, the input portion 21 receives the inputs of the process data of the pressure and acceleration put out from the process data measuring portion 4, the pressure fluctuation measuring portion 5 and the acceleration measuring portion 6 and transferred from the control unit 10 (Step S101). Then, the input portion 21 delivers these data to the state grasping portion 22, the frequency analyzing and sensor abnormality diagnosing portion 25, the gas turbine abnormality diagnosing portion 26 and the fuel characteristic grasping portion 27.

The fuel characteristic grasping portion 27 grasps the characteristic measured by the process data measuring portion 4 of the fuel to be supplied into the gas turbine 2 (Step S102). While the fuel to be supplied into the gas turbine 2 is stored in a tank (not shown) for example, as time passes, in the components constituting the fuel in the tank, a heavy molecule descends and a light molecule ascends and this generates a variation in the components (calories) of the fuel to be supplied into the gas turbine 2 according to the remains of the fuel in the tank. Therefore, when the measures (increase or decrease of the fuel-air ratio) are to be decided by the measures deciding portion 23, it is preferable that an adjustment is added to the decision corresponding to the components of the fuel that is being supplied into the gas turbine 2 at that time.

For this purpose, the process data measuring portion 4 comprises a calorimeter or a measuring device of the fuel component in the fuel system from the tank to the gas turbine 2. Based on the data of calories or components of the fuel so obtained, the fuel characteristic grasping portion 27 decides an adjusting quantity or data for increasing or decreasing the fuel-air ratio and puts it out to the state grasping portion 22.

The calories or components of the fuel are not necessarily measured real time by the process data measuring portion 4 but such method is also employable that the relation between the remainings of the fuel in the tank and the variation of the fuel components is measured in advance and, based on this, a table or chart for deciding the adjusting quantity is prepared. In this case, the process data measuring portion 4 measures the remainings of the fuel in the tank and, based on the remainings of the fuel so measured, the fuel characteristic grasping portion 27 decides the adjusting quantity for increasing or decreasing the fuel-air ratio. Also, the fuel is not necessarily stored in a tank but it may be supplied from a pipeline and, in this case also, the adjusting quantity is likewise decided.

Then, the gas turbine abnormality diagnosing portion 29 diagnoses whether there is an abnormality in the gas turbine 2 or not (Step S103).

For this purpose, the gas turbine abnormality diagnosing portion 29 receives from the input portion 21 the data of the temperature or flow rate at each part of the gas turbine 2 measured by the process data measuring portion 4 and, based on this, judges whether there is an abnormality of the gas turbine 2 or not. For example, if the temperature at a specific part of the gas turbine increases beyond a predetermined threshold or the flow rate at a specific part decreases below a predetermined threshold, etc., it is judged that there is an abnormality in the gas turbine 2 itself.

The gas turbine abnormality diagnosing portion 26 transfers to the state grasping portion 22 the result of the diagnosis, that is, the result of whether there is an abnormality of the gas turbine 2 or not.

Here, if a result of the diagnosis that there is an abnormality in the gas turbine 2 is transferred from the gas turbine abnormality diagnosing portion 26, the gas turbine control portion 3 notifies the operators, etc. that there arises the abnormality in the gas turbine 2 by a notifying means, such as an alarm, warning lamp or the like (Steps S104) and the step does not proceed to the adjustment process of the fuel-air ratio, etc.

In case where no abnormality is found in the gas turbine 2, then the frequency analyzing and sensor abnormality diagnosing portion 25 carries out a frequency analysis of the inner pressure fluctuation or acceleration and an abnormality diagnosis of the sensor (Step S105).

The frequency analyzing and sensor abnormality diagnosing portion 25 carries out a frequency analysis (fast Fourier transform: FFT) of the pressure fluctuation (vibration) based on the measured values of the pressure fluctuation measured by the pressure fluctuation measuring portion 5 in each of the combustors 111-1 to m.

Figure 5:
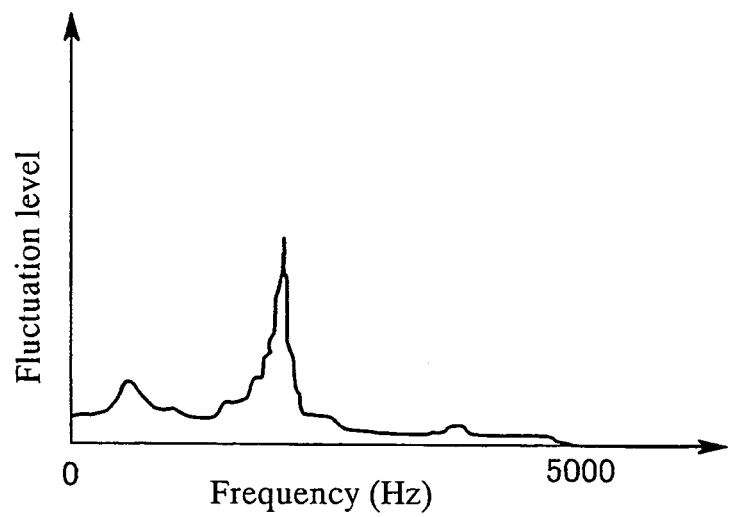
FIG. 5 is a view showing a result of a frequency analysis.

FIG. 5 shows one example of the result of the frequency analysis carried out by the frequency analyzing and sensor abnormality diagnosing portion 25 based on the measured values of the pressure fluctuation measured by the pressure fluctuation measuring portion 5. The horizontal axis shows the frequency and the vertical axis shows the strength (level) of the fluctuation. As shown in FIG. 5, the combustion fluctuation (pressure fluctuation and acceleration fluctuation) arising in the combustor 111 has a plurality of frequency bands in which the fluctuation arises.

As the fluctuation of each frequency is caused by respective complicated reasons, it is difficult to suppress the fluctuation by a simple standardized control or by a control of one parameter only. Also, according to the frequencies, the influences given on the gas turbine 2 are different. Hence, in case of the same fluctuation strength, even if one measure is allowable in certain frequencies, it might by no means be allowable in other frequencies. From this point of view, the control of the operation condition of the gas turbine 2 needs to be done with respect to a plurality of parameters corresponding to the frequencies of the fluctuation.

Figure 6:
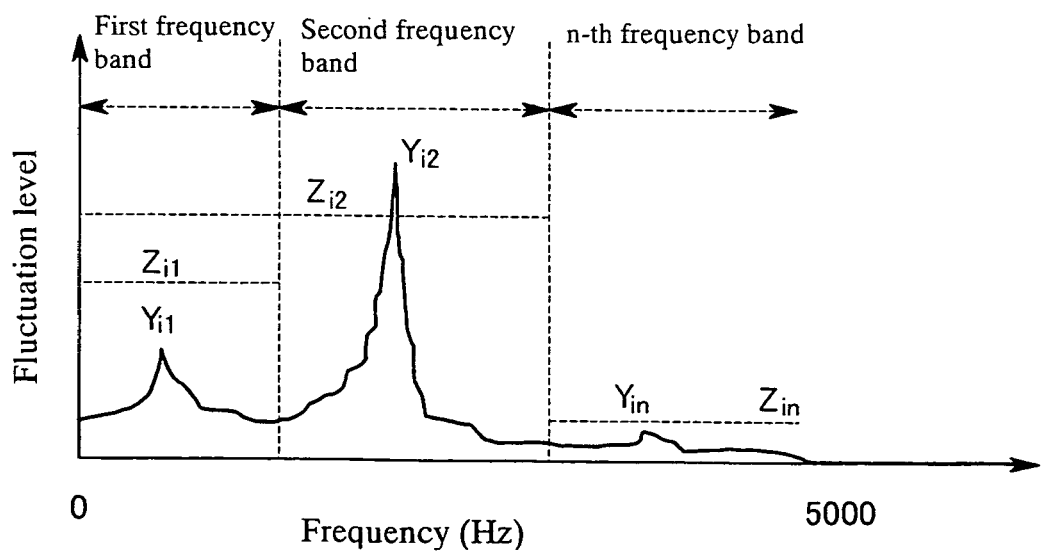
FIG. 6 is a view showing one example of a result of a frequency analysis, a plurality of frequency bands dividing the frequency and thresholds set for the respective frequency bands.

Thus, in the frequency analyzing and sensor abnormality diagnosing portion 25, as shown in FIG. 6, the result of the frequency analysis of the inner pressure fluctuation or acceleration is divided into a plurality (in the number of n) of the frequency bands so as to be put out as the analysis result divided into the frequency bands. It is to be noted that the frequency analyzing and sensor abnormality diagnosing portion 25 can also carry out a frequency analysis of acceleration based on the measured values of the acceleration measured by the acceleration measuring portion 6.

Here, the frequency band is an area of the frequency of the minimum unit by which the frequency analyzing and sensor abnormality diagnosing portion 25 can perform its function based on the result of the frequency analysis. First, the range of the frequency is decided in which the fluctuation of the pressure and acceleration are investigated. For example, in FIG. 5, as the fluctuation arises mainly in the range of 0 to 5000 Hz, the range of the frequency is set to 0 to 5000 Hz and this range of the frequency is divided into frequency bands of an appropriate size in the number of n. For example, if the range of the frequency is divided by 50 Hz, n equals 100 (n=100).

It is to be noted that this frequency band is not necessarily of a constant size.

The frequency analyzing and sensor abnormality diagnosing portion 25 puts out to the state grasping portion 22 the analysis result divided into the frequency bands of the pressure and acceleration obtained as mentioned above.

Also, the frequency analyzing and sensor diagnosing portion 25 diagnoses whether there is an abnormality or not in the pressure measuring device or acceleration measuring device itself of the pressure fluctuation measuring portion 5 or the acceleration measuring portion 6 or in the data transferring system by which the data put out from the pressure measuring device or acceleration measuring device is inputted into the input portion 21.

Figure 7:
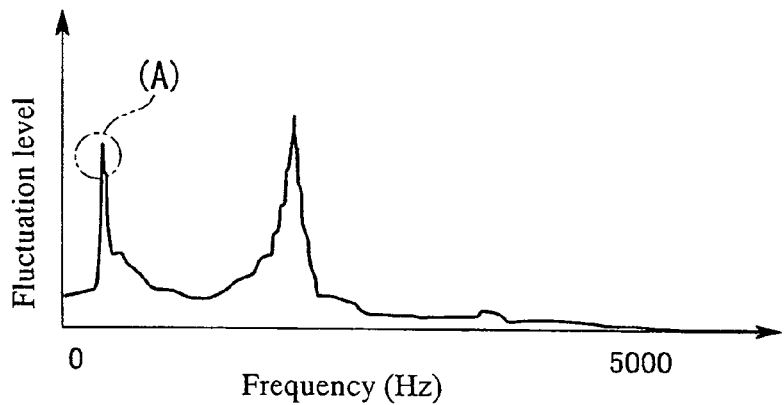
FIG. 7 comprises FIGS. 7(a) to (c) showing examples, respectively, of the result of the frequency analysis that is obtained in case where there is an abnormality in a pressure measuring device or an acceleration measuring device or in a data transferring system.
Figure 7:
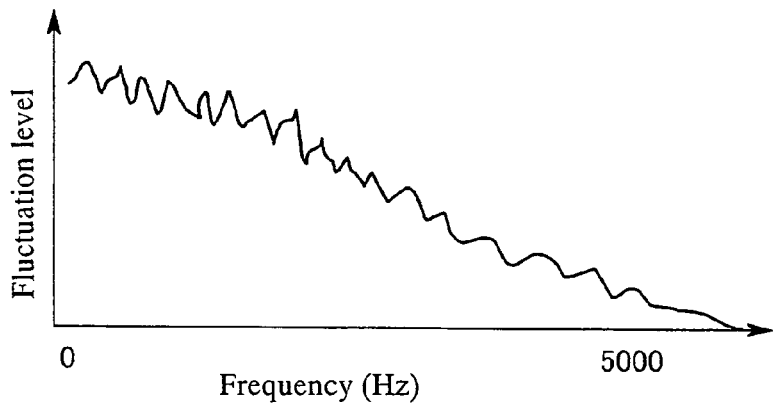
Figure 7:
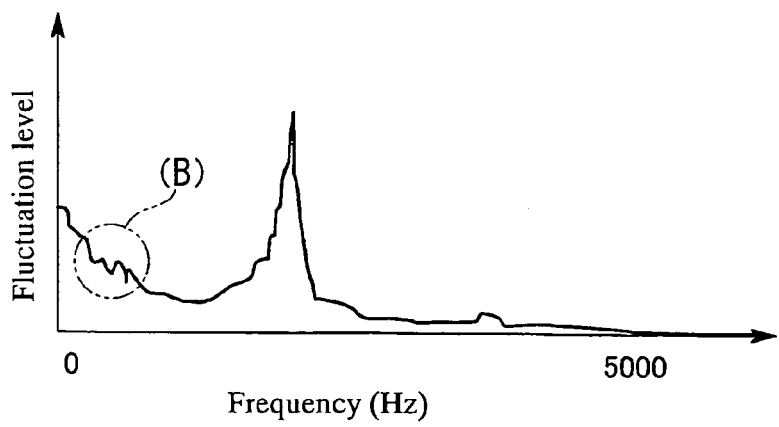

FIGS. 7(*a*) to (*c*) show examples of the analysis result put out as the result of the frequency analysis carried out by the frequency analyzing and sensor abnormality diagnosing portion 25 in case where there is an abnormality in the pressure measuring device or acceleration measuring device or in the data transferring system.

In FIG. 7(*a*), in a portion shown by a reference letter (A), noise of a power source frequency component (60 Hz, for example) appears. Also, in FIG. 7(*b*), noise of a random state adds to the entire frequency bands and, as compared with the original level (see FIG. 5), the entire level is increased. Also, in FIG. 7(*c*), in a portion shown by a reference letter (B), that is, in the area of frequency less than several tens Hz, noise of a pulse shape, especially of a direct current component, adds and thereby the level is increased in the entire frequency bands. Or, otherwise, if the pressure measuring device or acceleration measuring device itself is deteriorated, the level is decreased in the entire frequency bands.

The frequency analyzing and sensor abnormality diagnosing portion 25 judges whether the fluctuation level-deviates from a predetermined range or not and, if a deviation is found, judges that there is an abnormality in the pressure measuring device or acceleration measuring device or in the data transferring system and puts out the result of the judgement to the state grasping portion 22. In the frequency analyzing and sensor abnormality diagnosing portion 25, a threshold is set so that, if the analysis result of the above-mentioned patterns is obtained, this is detected and thereby whether there is an abnormality or not-in the pressure measuring device or acceleration measuring device itself or in the data transferring system is judged and the analysis result thereof is put out to the state grasping portion 22.

It is to be noted that, if a plurality of sets of the pressure measuring devices and acceleration measuring devices are provided in the frequency analyzing and sensor abnormality diagnosing portion 25, by comparing the results of the measurements by these plural sets of the pressure measuring devices and acceleration measuring devices, whether there has been an abnormality or not in these plural sets of the pressure measuring devices and acceleration measuring devices or in the data transferring system of the data put out from the pressure measuring devices and acceleration measuring devices can also be judged. For example, a plurality (in an odd number) of sets of the pressure measuring devices and acceleration measuring devices are provided and, if different analysis results are obtained, the most frequent analysis results can be taken by majority.

Also, the acceleration measuring portion 6 detects the vibration of the combustor 111 itself as the acceleration and thus a single acceleration measuring portion 6 can monitor the combustion fluctuation arising in the plural combustors 111. Hence, even if a sensor abnormality is judged in the pressure fluctuation measuring portion 5 provided in one combustor 111, the acceleration measuring portion 6 can detect the combustion fluctuation. If a plurality of the acceleration measuring portions 6 are provided, even if the pressure fluctuation measuring portion 5 detects no combustion fluctuation, at least two of the acceleration measuring portions 6 detect the combustion fluctuation and judge the existence of the combustion fluctuation and thereby the reliability can be enhanced. Also, if both of the pressure fluctuation measuring portion 5 and the acceleration measuring portion 6 detect the combustion fluctuation and judge the existence of the combustion fluctuation, then the reliability can be likewise enhanced.

Returning to the process steps, in case the above-mentioned series of steps are of the second cycle or subsequent cycles, if any adjustment has been carried out in the previous process cycle, evaluation of the effect of the adjustment so carried out is commenced (Step S106).

First, the state grasping portion 22 compares the analysis result divided into the frequency bands of the pressure and acceleration with the predetermined threshold (Step S107).

Here, the threshold is not always needed to be one number for each of the frequency bands 1 to n. That is, a plurality of thresholds may be prepared. Generally, such a threshold is used as to judge whether the on-going combustion fluctuation is in the state that an immediate adjustment is needed or not (this threshold is referred as an administrative value). But, in addition to this, such a threshold may be used as to judge whether the on-going combustion fluctuation is in the state that no immediate adjustment is needed, although on-going, but a prior symptom of the combustion fluctuation appears or not.

As the result of the comparison with the threshold, if there is no deviation from the administrative value and still there is no prior symptom of the combustion fluctuation, based on the process data measured by the process data measuring portion 4, whether the operation state of the gas turbine 2 has been changed from the previous processing cycle or not is judged (Step S108). As the result of this, if there is no change in the operation state, the step is returned to the Step S101 and the next processing cycle takes place. On the other hand, if there is a change in the operation state, contents of the adjustment carried out in the previous process cycle and the data of the operation state changed as the result thereof are stored as an addition and renewal in the data base 30 (Step S109).

Also, as the result of the comparison with the threshold in the Step S107, if it is so judged that there is a deviation from the administrative value or there is a prior symptom of the combustion fluctuation, contents of the adjustment carried out in the previous process cycle and the data of the operation state changed as the result thereof are likewise stored as an addition and renewal in the data base 30 (Step S110).

In the Step S109 or S110, the data stored in the data base 30 are sorted in the way shown in FIG. 8, for example. In the data base 30, the process data and the maximum value $Y_{in}$ of the fluctuation strength of each of the frequency bands are sorted in time series. That is, in the data base 30, the process data and the maximum value $Y_{in}$ of the fluctuation strength of each of the frequency bands are regulated and sorted at each of the times $t_1, t_2, \ldots$. If these data are transmitted one after another to the data base 30 from the control unit 10 and the frequency analyzing and sensor abnormality diagnosing portion 25, these data are additionally stored in the data base 30. The data of the fluctuation strength to be stored in the data base 30 may be of the pressure fluctuation only or the acceleration fluctuation only or both of the pressure fluctuation and the acceleration fluctuation.

FIG. 8 shows that, at the time ti, the valve opening of the by-pass valve 118 is $X_{11\text{-}1}$, the pilot ratio is $X_{12\text{-}1}$, the atmospheric temperature is $X_{21\text{-}1}$ and the load (MW) of the generator is $X_{22\text{-}1}$ and also that the maximum value of the fluctuation strength of the first frequency band is $Y_{11\text{-}1}$, the maximum value of the fluctuation strength of the second frequency band is $Y_{12\text{-}1}$ and the maximum value of the fluctuation strength of the n-th frequency band is $Y_{in\text{-}1}$.

Likewise, FIG. 8 shows that, at the time $t_2$, the valve opening of the by-pass valve 118 is $X_{11\text{-}2}$, the pilot ratio is $X_{12\text{-}2}$, the atmospheric temperature is $X_{21\text{-}2}$ and the load (MW) of the generator is $X_{22\text{-}2}$ and also that the maximum value of the fluctuation strength of the first frequency band is $Y_{11\text{-}2}$, the maximum value of the fluctuation strength of the second frequency band is $Y_{12\text{-}2}$ and the maximum value of the fluctuation strength of the n-th frequency band is $Y_{in\text{-}2}$. Also, FIG. 8 shows that, at the time $t_n$, the valve opening of the by-pass valve 118 is $X_{11\text{-}n}$, the pilot ratio is $X_{12\text{-}n}$, the atmospheric temperature is $X_{21\text{-}n}$ and the load (MW) of the generator is $X_{22\text{-}n}$ and also that the maximum value of the fluctuation strength of the first frequency band is $Y_{11\text{-}n}$, the maximum value of the fluctuation strength of the second frequency band is $Y_{12\text{-}n}$ and the maximum value of the fluctuation strength of the n-th frequency band is $Y_{in\text{-}n}$.

As mentioned above, the reference sub-numbers of $X_{11\text{-}1}$, $X_{11\text{-}2}$, $X_{11\text{-}n}$, etc. in FIG. 8 correspond to the respective times $t_1, t_2, t_n$. In the present embodiment, as the description can be made commonly without differentiating the times $t_1, t_2$ and $t_n$, designation of the reference sub-numbers below will be omitted.

As mentioned before, as the result of the comparison with the threshold in the Step S107, if it is so judged that there is a deviation from the administrative value or there is a prior symptom of the combustion fluctuation, then the characteristic of the on-going combustion fluctuation is calculated (Step S111).

For this purpose, in the combustion characteristic grasping portion 28, based on the analysis result divided into the frequency bands of the pressure and acceleration from the frequency analyzing and sensor abnormality diagnosing portion 25 and the process data from the process data measuring portion 4, both stored in the data base 30, a formula model is constructed for modeling the combustion characteristic. It is to be noted that the basic function of the combustion characteristic grasping portion 28 as described next is described also in the Patent Document 3 (the Japanese laid-open patent application 2002-47945 of the same applicant here).

For example, where m is the number of the combustors and n is the number of the frequency bands to be modeled, the inner pressure fluctuation is modeled by a multiple regression model of the following equation (1):

$$Y_{ij} = a_{ij}, 0 + a_{ij}, 1 x X_{11} + a_{ij}, 2 x X_{12} + a_{ij}, 3 x X_{21} + a_{ij}, 4 x X_{22} \qquad (1)$$

Here:
- $Y_{ij}$: The maximum amplitude value of the j-th frequency band (j=1, 2, ..., n) of the i-th combustor (i=1, 2, ..., m)
- $X_{11}$: Value of the operational data 1 (In this example, the valve opening of the by-pass valve 118)
- $X_{12}$: Value of the operational data 2 (In this example, the pilot ratio)
- $X_{21}$: Value of the non-operable state data 1 (In this example, the meteorological data)
- $X_{22}$: Value of the non-operable state data 2 [In this example, the load of the generator (MW)]
- $a_{ij}$, $0, a_{ij}$, $1, a_{ij}$, $2, a_{ij}$, $3, a_{ij}$, 4: Coefficient parameters The combustion characteristic grasping portion 28 uses the maximum amplitude value $Y_{ij}$, the operational data $X_{11}$, $X_{12}$ and the non-operable state data $X_{21}$, $X_{22}$ regulated and sorted for each of the times ($t_1$, $t_2$, ...) in the data base 30 and obtains the coefficient parameters $a_{ij}$, $0, a_{ij}$, $1, a_{ij}$, $2, a_{ij}$, $3, a_{ij}$, 4 of the above-mentioned equation (1). As the solution of the coefficient parameters $a_{ij}$, $0, a_{ij}$, $1, a_{ij}$, $2, a_{ij}$, $3, a_{ij}$, 4, the least-squares method, for example, is used.

Here, the maximum amplitude value $Y_{ij}$ is a maximum amplitude value that is obtained such that an A/D conversion of the data of the measuring result measured by the pressure fluctuation measuring portion 5 and the acceleration measuring portion 6 is carried out by the frequency analyzing and sensor abnormality diagnosing portion 25, the result of the frequency analysis is divided into the frequency bands of the n-number and the maximum amplitude value is obtained for a certain point of time ($t_1$, $t_2$, ...) with respect to the respective frequency bands.

In FIG. 6, it is shown that the maximum amplitude value of the first frequency band is $Y_{i1}$, the maximum amplitude value of the second frequency band is $Y_{i2}$ and the maximum amplitude value of the n-th frequency band is $Y_{in}$.

It is to be noted that, in the above, for convenience of the description, the model equation is given with the operational data of 2 variables and the non-operable state data of 2 variables but the variables are not necessarily limited to 2. Also, as the model structure, a linear first-order equation is described but a high order model of a second or higher order or a non-linear model of a neural network, etc. may be used. Also, the model equation is described with respect to the method using the operational data inputted from the gas turbine 2 and the non-operable state data but the values converted based on the law of mass balance or the like may be used.

The combustion characteristic grasping portion 28 uses the above-mentioned formula model (1) obtained for each of the times $t_1$, $t_2$, ... and obtains an area where the combustion fluctuation is apt to arise.

For example, where the operational data 1, the operational data 2, the non-operable state data 1 and the non-operable state data 2 are $X'_{11}$, $X'_{12}$, $X'_{21}$ and $X'_{22}$, respectively, the inner pressure fluctuation predicted value $Y'_{ij}$ of the j-th frequency band of the i-th combustor is obtained by the following equation (2):

$$Y'_{ij} = a_{ij}, 0 + a_{ij}, 1xX'_{11} + a_{ij}, 2xX'_{12} + a_{ij}, 3xX'_{21} + a_{ij}, 4xX'_{22} \quad (2)$$

As mentioned above, the coefficient parameters $a_{ij}$, $0, a_{ij}$, $1, a_{ij}$, $2, a_{ij}$, $3, a_{ij}$ and 4 are obtained by the least-squares method, for example.

As shown in FIG. 6, for the maximum amplitude value of the j-th frequency band (frequency bands 1 to n) of the i-th combustor, thresholds $Z_{i1}$, $Z_{i2}$, ..., $Z_{in}$ are provided corresponding to the structure or the like of the combustor and the surroundings thereof. These thresholds are contained in the frequency analyzing and sensor abnormality diagnosing portion 25. Here, the thresholds $Z_{i1}$, $Z_{i2}$, ..., $Z_{in}$ are the values showing the maximum fluctuation strength allowable in each of the frequency bands. These thresholds are decided based on, for example, whether there is a member or structure resonating to the vibration of that frequency or not, whether there is a member or structure liable to be damaged or not, to what extent the fluctuation strength is allowable, etc.

Where $Z_{ij}$ is a threshold for the maximum amplitude value of the j-th frequency band of the i-th combustor put out from the frequency analyzing and sensor abnormality portion 25, there exist $X'_{11}$, $X'_{12}$, $X'_{21}$ and $X'_{22}$ that satisfy the following equation (3):

$$Z'_{ij} = a_{ij}, 0 + a_{ij}, 1xX'_{11} + a_{ij}, 2xX'_{12} + a_{ij}, 3xX'_{21} + a_{ij}, 4xX'_{22} \quad (3)$$

If the values of the non-operable state data 1 and the non-operable state data 2 are inputted into the combustion characteristic grasping portion 28 from the control unit 10, all the factors other than $X'_{11}$ and $X'_{12}$ in the equation (3) become constant and ($X'_{11}$, $X'_{12}$) that satisfy the equation (3) can be easily obtained.

If a gain $\alpha_k$ (k=1,2, ... p) is given by the control unit 10, the following equation (4) is applicable:

$$\alpha_k Z_{ij} = a_{ij}, 0 + a_{ij}, 1xX'_{11} + a_{ij}, 2xX'_{12} + a_{ij}, 3xX'_{21} + a_{ij}, 4xX'_{22} \quad (4)$$

Figure 9:
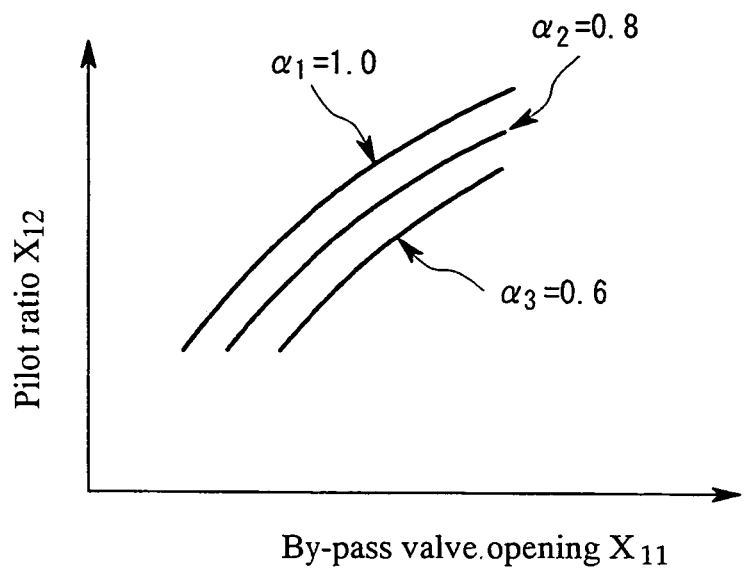
FIG. 9 is a view showing a principle of a combustion fluctuation area assessment method.

If ($X'_{11}$, $X'_{12}$) are obtained by the equation (4), lines of the number of p can be obtained for each of the frequency bands of each of the combustors. This is shown in FIG. 9, in which the horizontal axis is $X_{11}$ and the vertical axis is $X_{12}$. Here, if the coefficient parameter $a_{ij}$,2 is positive, the upper side of each of the lines is an area where the combustion fluctuation is apt to arise and the lower side is an area where the combustion fluctuation hardly arises. Reversely, if the coefficient parameter $a_{ij}$,2 is negative, the lower side of each of the lines is an area where the combustion fluctuation is apt to arise and the upper side is an area where the combustion fluctuation hardly arises.

Figure 10:
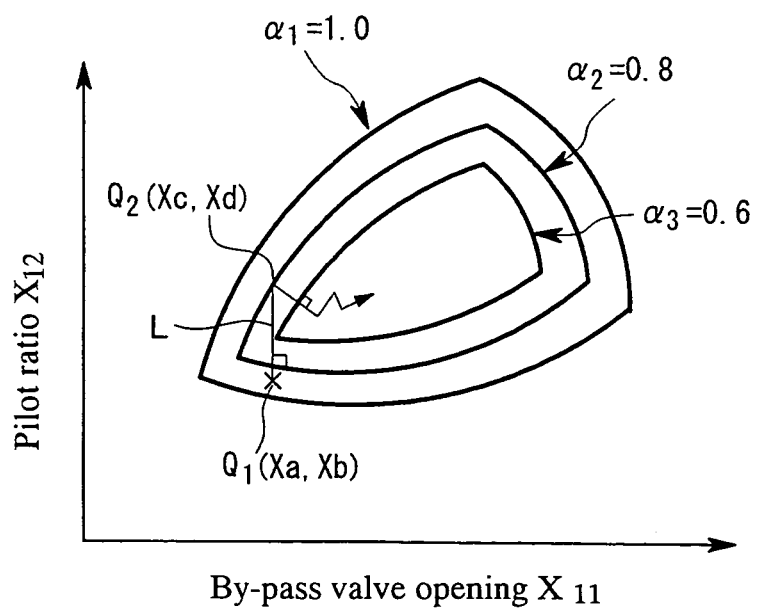
FIG. 10 is a view showing one example of a combustion fluctuation area assessment.

In the combustion characteristic grasping portion 28, by using the threshold $Z_{ij}$ (i=1, 2, ... m, j=1,2, ... n) for the maximum amplitude value of the j-th frequency band of the i-th combustor, the gain $\alpha_k$ (k=1, 2, ... p) and the values of variables (that is, $X_{11}$, $X_{12}$ at each of the times $t_1$, $t_2$, ... as the result of the actual operation) except the specific data of two kinds (that is, the non-operable state data $X_{21}$ and $X_{22}$ at each of the times $t_1$, $t_2$, ... as the result of the actual operation), all put out from the control unit 10, as well as by using the coefficient parameters $a_{ij}$, $0, a_{ij}$, $1, a_{ij}$, $2, a_{ij}$, $3, a_{ij}$ and 4 obtained by the least-squares method or the like, the above-mentioned lines are obtained for all the frequency bands of all the combustors. Then, based on the procedures of the linear programming method, the area where the combustion fluctuation is apt to arise and the area where the combustion fluctuation hardly arises are finally obtained. FIG. 10 shows an example of the areas of the combustion fluctuation obtained by the combustion characteristic grasping portion 28, wherein likewise the horizontal axis is $X_{11}$ and the vertical axis is $X_{12}$. In this example, the area of the combustion fluctuation is expressed by a line like a contour line for each of the gains $\alpha_k$ and the central area surrounded by the lines is the area where the combustion fluctuation hardly arises and the area outside thereof is the area where the combustion fluctuation is apt to arise.

It is to be noted that FIG. 10, as mentioned above, is shown in the two-dimensional coordinates because the operational data have been limited to the two variables for convenience of description but if the operational data are set with N variables, the areas can be expressed in the space of N-dimensional coordinates.

The measures deciding portion 23, upon an input of an adjustment command from the state grasping portion 22, responds to this adjustment command so as to decide the contents of the measures (place of the measures and adjusting quantity or data) for adjusting the on-going operation state ($X_{11}=x_a$, $X_{12}=x_b$) (Step S112).

At this time, if the maximum amplitude values in the plural frequency bands exceed the respective thresholds $z_{i1}, z_{i2}, \ldots, z_{in}$), based on the preferential order (priority order) decided in advance and stored in the basic data base 31, the adjustment is made to the frequency band of the high priority order. In the present example, it is so set that the lowest frequency band is given with the highest priority and then the priority is sequentially given from the frequency band of the high frequency side. This is for the reason that, if the combustion fluctuation arises in the lowest frequency band, there is a high possibility that the gas turbine 2 is in the state that the fire therein may easily go out and also in the higher frequency bands, the energy of the combustion fluctuation is large enough to give bad influences, such as damages or the like.

After the frequency bands to be adjusted are selected, the adjusting quantity is decided. For this purpose, the measures deciding portion 23 decides the direction of the adjustment of the on-going operation state ($X_{11}=x_a$, $X_{12}=x_b$) by an optimizing means. Herein, as the optimizing means, an example to use the steepest-descent method (saddle-point method) will be described, provided that the optimizing means is not limited to the steep-descent method.

That is, the measures deciding portion 23 refers to FIG. 10 obtained by the combustion characteristic grasping portion 28 and, as shown in FIG. 10, draws a fictitious line L orthogonally to the line on a further central portion side ($\alpha_2=0.8$) of point $Q_1$ that shows the on-going operation state ($X_{11}=x_a$, $X_{12}=x_b$) until the fictitious line L passes through the area surrounded by the line of 0.2 and reaches point Q2 ($X_{11}=x_c$, $X_{12}=x_d$) where the fictitious line L hits on the line of $\alpha_2$. Then, the fictitious line L is elongated orthogonally to the line on a still further central portion side ($\alpha_3=0.6$) of the point $Q_2$. The direction to which the measures deciding portion 23 draws and elongates the fictitious line L from the point $Q_1$ via the point $Q_2$ is the direction of the adjustment decided by the measures deciding portion 23.

At this time, if the combustion characteristic grasping portion 28 cannot sufficiently grasp the combustion characteristic, the measures deciding portion 23 can decide the direction of the adjustment based on the information stored in the knowledge data base 32 containing the adjustment carried out in the past and the information related with the change in the operation state of the gas turbine 2 as the result of the adjustment.

Also, if sufficient data are not stored in the data base 30 yet for any reason, such as immediately after the installation of the gas turbine 2, etc., the direction of the adjustment can be decided by using the data stored in the basic data base 31 and the knowledge data base 32.

Here, in the basic data base 31, a formula model showing a standard combustion characteristic obtained as the analysis result of the data collected from another same type gas turbine 2 already installed and operated, a restrictive information on the operation of the gas turbine 2, etc. are stored. The restrictive information is, for example, a limit value of the fuel-air ratio for avoiding a misfire or backfire, etc. Also, in the knowledge data base 32, an experiential information containing symptoms of problem set based on the experiences (know-how) of skilled adjusting operators and the information related with effective measures for such symptoms is stored. The measures deciding portion 23 can decide the contents of the adjustment based on these formula model showing the standard combustion characteristic, restrictive information, experiential information, etc. stored in the basic data base 31 and the knowledge data base 32.

For example, in FIG. 11, if an adjustment is decided so as to be done for the first frequency band, first to open the by-pass valve 118 is the measures of the first priority. If the combustion fluctuation still arises even after the process cycles of plural times or if no measures can be taken because of a restriction from the operation condition, increase of the pilot ratio is carried out as the countermeasure of the second priority. As a matter of course, even if the combustion characteristic grasping portion 28 sufficiently grasps the combustion characteristic, the direction of the adjustment and the quantity thereof can be decided by using the restrictive information stored in the basic data base 31.

It is to be noted that when the above-mentioned adjustment is to be done, based on the data of the fuel characteristic obtained from the fuel characteristic grasping portion 27 by the state grasping portion 22, the measures deciding portion 23 can add a correction corresponding to the then effective fuel characteristic.

The contents of the adjustment carried out based on the information stored in the basic data base 31 and the knowledge data base 32 and the change in the state of the gas turbine 2 as the result of the adjustment are evaluated by the Steps S107 to S110 of the next process cycle and stored (reflected) in the data base 30 and, if they are different from the experiential information of the knowledge data base 32, they are used for a renewal thereof.

Then, the output portion 24 puts out to the control unit 10 the data showing the direction of the adjustment decided by the measures deciding portion 23 (Step S113).

Upon receiving this, based on the above-mentioned data showing the direction of the adjustment inputted from the output portion 24, the control portion 10 controls the operating mechanism 7 so as to operate the main fuel flow control valve 113, the pilot fuel flow control valve 114, the by-pass valve 118 and the inlet guide vane 102 and change the by-pass valve opening $X_{11}$ and the pilot ratio $X_{12}$, respectively. That is, for an adjusting command inputted from the output portion 24 so as to move the fictitious line L from the point $Q_1$ to the point $Q_2$, the control portion 10 controls at least any one of the main fuel flow control valve 113, the pilot fuel flow control valve 114, the by-pass valve 118 and the inlet guide vane 102 so that the by-pass valve opening $X_{11}$ is changed from $x_a$ to $x_c$ and the pilot ratio $X_{12}$ is changed from $x_b$ to $x_d$. Also, for an adjusting command on the direction to which the fictitious line L is to further elongate from the point $Q_2$, the by-pass valve opening $X_{11}$ and the pilot ratio $X_{12}$ are likewise changed, respectively.

Here, the pilot ratio $X_{12}$ is a ratio of the pilot fuel flow rate/the entire fuel flow rate. The entire fuel flow rate is the sum of the main fuel flow rate and the pilot fuel flow rate. Thus, if the pilot ratio $X_{12}$ is to be increased, the control unit 10 can make adjustment so as to decrease the entire fuel flow rate without changing the pilot fuel flow rate or so as to increase the pilot fuel flow rate without changing the entire fuel flow rate.

The series of processes of the above-mentioned Steps Slo1 to S113 are repeatedly carried out at each of the times $t_1, t_2, \ldots$ in operation of the gas turbine 2.

According to the present embodiment, operation of the gas turbine is controlled and the combustion fluctuation can be suppressed. At this time, if the combustion fluctuation arises in a plurality of frequency bands, adjustment is carried out so that, corresponding to a predetermined priority order, the combustion fluctuation of the frequency band of a high priority order is suppressed. Thereby, the combustion fluctuation of the frequency band of a high urgency is effectively suppressed and an excellent combustion state can be maintained.

Also, after the adjustment has been done, if there is a change in the state of the gas turbine 2, it is reflected on the data base 30. Thereby, as time passes, such an information as what kind of adjustment is to be done and what kind of reaction therefor the gas turbine 2 exhibits can be stored and appropriate measures can be taken. Further, immediately after the installation of the gas turbine 2, if there is stored no sufficient data in the data base yet, the adjustment is carried out based on the formula model showing a standard combustion characteristic or the restrictive information obtained by analysis of the data collected from another same type gas turbine 2 and contained in the basic data base 31 as well as based on the data of the experiential information on the experiences of the skilled adjusting operators contained in the knowledge data base 32. Thereby, from immediately after the installation of the gas turbine 2, control with a high reliability can be carried out. Moreover, if the data of the restrictive information or the data of the experiential information based on the skilled adjusting operators, contained in the basic data base 31 or the knowledge data base 32, is renewed based on the contents of the adjustment and the change in the state of the gas turbine 2 as the result of the adjustment, an uncertain restrictive information or experiential information not based on sufficient past actual examples can be corrected and a further appropriate control can be carried out. If such restrictive information or experiential information is corrected and the reaction of the gas turbine 2 as the result of the adjustment using the corrected information is stored in the data base 30, then the restrictive information or experiential information can be made more reliable.

Also, if an abnormality arises in the gas turbine 2 itself, the pressure fluctuation measuring portion 5 or the acceleration measuring portion 6, even if the abnormality is detected, no adjustment is done therefor. Thereby, the abnormality can be rapidly taken care of and an adjustment in a wrong direction can be avoided. Also, there is carried out no storing in the data base 30 of the information of adjustment in case of the abnormality arising in the gas turbine 2 itself, the pressure fluctuation measuring portion 5 or the acceleration measuring portion 6.

Furthermore, by adding an adjustment corresponding to the variation in the fuel composition, the combustion state can be further stabilized.

In the gas turbine system 1 as mentioned above, the automatic adjusting portion 20 may be constructed to have an optimal operation condition searching function as shown below.

Here, supposing that the gas turbine 2 is stably operated in a steady state where there is no combustion fluctuation, the operation condition is variously changed and a better operation condition, preferably an optimal operation condition, is automatically searched in the automatic adjusting portion 20.

At this time, in order to realize the better or optimal operation condition, while an importance is put on the stability not causing the combustion fluctuation, it is preferable that not only the stability but also the economy of operation, environment preservation performance or life of each portion of the system are taken into consideration for obtaining the operation condition.

Also, in varying the operation condition, based on the data stored in the past, a change in the combustion state in case of varying the operation condition is predicted and only in the case where it is so judged that even after the variation, no combustion fluctuation arises, the operation condition is varied.

Further, if the combustion fluctuation has arisen as the result of varying the operation condition, the combustion fluctuation is converged. Thereafter, the variation range of the operation condition is changed and the search of the operation condition can be again carried out. Also, if it is the situation that the variation of the operation condition is not preferable, the search of the operation condition can be stopped from outside.

Moreover, at the time of start or stop of the gas turbine system 1 also, the automatic adjusting portion 20 can likewise search the operation condition and an optimal operation condition can be obtained.

Figure 12:
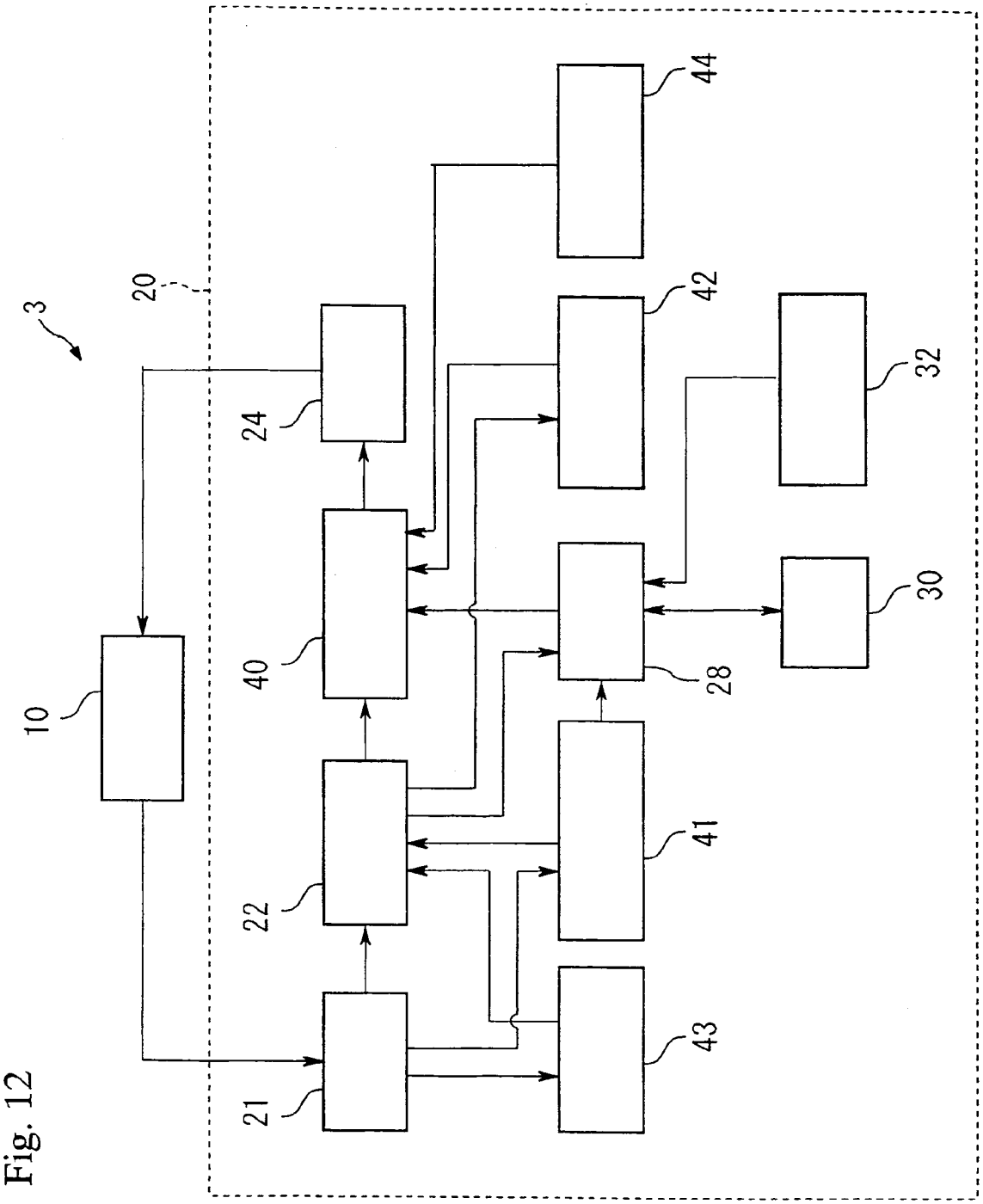
FIG. 12 is a view showing a functional construction of a gas turbine control portion for carrying out a condition search process.

FIG. 12 is a view showing a construction of the automatic adjusting portion 20 for realizing the above-mentioned function. As shown in FIG. 12, as the construction to realize the search function, the automatic adjusting portion 20 comprises the input portion 21, the state grasping portion 22, the output portion 24, the combustion characteristic grasping portion 28, the data base 30 and the knowledge data base 32, that are the same as those of the construction shown in FIG. 3. Moreover, in order to carry out the search by varying the combustion condition, the automatic adjusting portion 20 functionally comprises a correction quantity calculating portion 40 that calculates a correction quantity or data for adjusting a flow rate of at least one of the fuel and air supplied into the combustor 111, a frequency analyzing portion 41 that divides the analysis result of the frequency of the inner pressure fluctuation and acceleration into a plurality (in the number of n) of frequency bands, as shown in FIG. 6, and puts out the analysis result divided into the frequency bands, a performance and life evaluating portion 42 that evaluates the performance of each portion as well as evaluates the life of each portion based on the process data measured by the process data measuring portion 4 and a stop command input portion 43 that stops to vary the operation condition based on a stop command inputted from outside.

Next, the above-mentioned search function of the automatic adjusting portion 20 will be described along the flow of the actual process.

Figure 13:
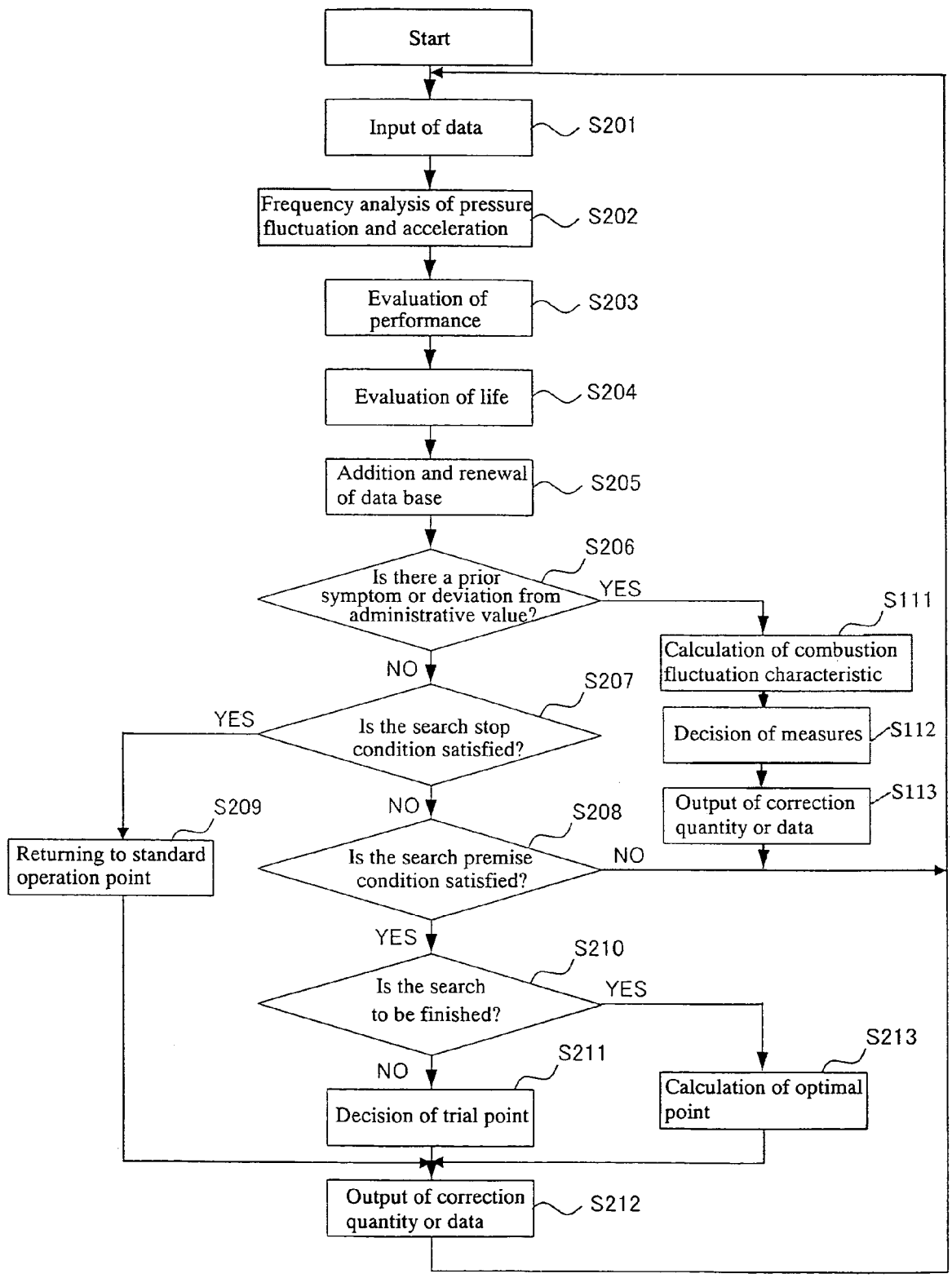
FIG. 13 is a view showing a flow of the condition search process of FIG. 12.

FIG. 13 is a view showing a flow of process realizing the function of the automatic adjusting portion 20 based on the program introduced in advance in the gas turbine control portion 3. This process is contained as a portion of the program for operating the gas turbine 2 and carries out a series of steps while the gas turbine 2 is operated with a predetermined condition being satisfied.

The predetermined condition includes, for example:
Condition 1: The generator 121 is in a load regulated state in which the output of the generator 121 continues to be within the range of a predetermined threshold for a predetermined time period.
Condition 2: No combustion fluctuation arises for a predetermined time period. That is, in the Step S107, the state in which no judgement of a deviation from the administrative value or a prior symptom of the combustion fluctuation is made continues for a predetermined time period or more.

Condition 3: The temperature of the intake air continues to stay within the range of a predetermined threshold for a predetermined time period.

Condition 4: The operator selects a search allowing mode that allows to commence the search.

When the search process is to be commenced, the input portion 21 first receives the input of the data of the process data and the pressure or acceleration put out from the process data measuring portion 4, the pressure fluctuation measuring portion 5 and the acceleration measuring portion 6 and transferred from the control unit 10 (Step S201). Then, the input portion 21 delivers these data to the state grasping portion 22 and the frequency analyzing portion 41.

Subsequently, the frequency analyzing portion 41 carries out the frequency analysis of the inner pressure fluctuation or acceleration (Step S202).

Like the Step S105 of FIG. 4, the frequency analyzing portion 41 carries out the frequency analysis (FFT) of the pressure fluctuation (vibration) based on the pressure fluctuation measured value measured by the pressure fluctuation measuring portion 5 in each of the combustors 111-1 to m. The frequency analyzing portion 41 puts out to the state grasping portion 22 the analysis result divided into the frequency bands of the pressure or acceleration obtained as the result of the analysis.

The state grasping portion 22 receives the data of the process data and the pressure or-acceleration from the input portion 21 and delivers them to the performance and life evaluating portion 42. Based on these data, the performance and life evaluating portion 42 calculates a thermal efficiency by the ratio of the power generation quantity of the generator 121 to the supply quantity of the fuel as well as calculates an efficiency (element efficiency) of each element of the gas turbine system 1, such as an adiabatic efficiency at the compressor 101 or the like, and returns the result of the calculation to the state grasping portion 22 (Step S203).

Also, the performance and life evaluating portion 42 calculates the consumed life of each element of the gas turbine system 1 based on the total operation time, load hysteresis, etc. of the gas turbine system 1 as well as calculates a remaining life of each element based on the load predicted by varying the operation condition (Step S204). The performance and life evaluating portion 42 returns the calculated life information to the state grasping portion 22.

Then, in case of processing the second or subsequent times, the data of the process data and the pressure or acceleration put out from the input portion 21 at that time and the analysis result divided into the frequency bands of the pressure or acceleration at the frequency analyzing portion 41 are related with the data showing the operation condition included in the process data, that is, the operational data (plant data), and are additionally stored in the data base 30 (Step S205).

Figure 14:
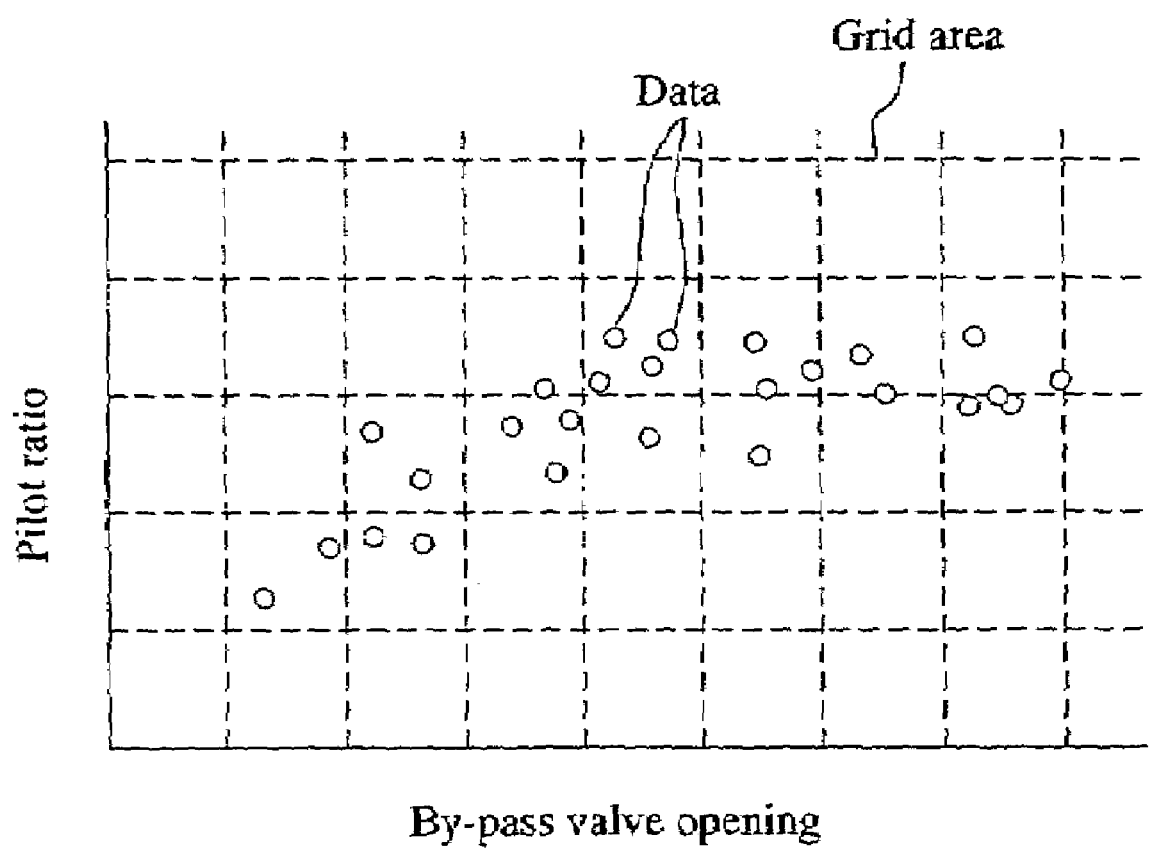
FIG. 14 is a view explaining a method for administrating stored data by grid areas sectioned into a plurality of areas.

When the data are to be so added to the data base 30, if a predetermined standard is satisfied, the past data are erased. Concretely, if the operation condition is graphed as shown in FIG. 14, the data are divided into a plurality of sections for each of the parameters (process data) so that the graph area is sectioned into a plurality of grid areas. And, if the data of a predetermined number are stored in the grid area to which the data are added, the oldest data are deleted and instead new data are added. Thereby, storing of many data only of similar operation conditions is avoided. Also, if the data are to be deleted, the oldest data are deleted. Thus, the new data that have less influence of the aged deterioration can be stored to be effectively made use of. For this purpose, it is preferable that the data to be stored in the data base are related with the time information.

The state grasping portion 22 compares the analysis data divided into the frequency bands of the pressure or acceleration with the predetermined threshold. At this time, judgement is made, in comparison with the threshold, on whether the situation is in the state of a prior symptom or not in which, although there is the combustion fluctuation, no immediate adjustment is needed or whether there is a deviation or not from the administrative value by which the necessity of an immediate adjustment of the on-going combustion fluctuation is judged (Step S206).

As the result of the comparison with the threshold in the Step S206, if it is so judged that there is a deviation from the administrative value or there is a prior symptom of the combustion fluctuation, then the step is proceeded to the Steps S111 to S113 as shown in FIG. 4. That is, the combustion characteristic grasping portion 28 calculates the characteristic of the on-going combustion fluctuation (Step S111) and obtains an area where the combustion fluctuation is apt to arise and an area where the combustion fluctuation hardly arises. Then, the measures deciding portion 23 as shown in FIG. 3 decides the direction (countermeasures) to which the on-going operation state (X11=xa, X12=xb) is to be adjusted (Step S112). Further, the output portion 24 puts out to the control unit 10 the data of the correction quantity showing the direction of the adjustment decided by the measures deciding portion 23 (Step S113).

Upon receiving this, the control unit 10 controls, the operating mechanism 7, based on the data inputted from the output portion 24 and showing the above-mentioned direction of the adjustment, so that the main fuel flow control valve 113, the pilot fuel flow control valve 114, the by-pass valve 118 and the inlet guide vane 102 are operated and the by-pass valve opening X11 and the pilot ratio X12, respectively, are changed.

At this time, if the combustion characteristic grasping portion 28 cannot sufficiently grasp the combustion characteristic, the measures deciding portion 23 can decide the contents of the adjustment based on the information of the symptoms and the experiential information related with the effective measures for such symptoms, all such information being set based on the formula model showing a standard combustion characteristic, the restrictive information and the experiences (know-how) of the skilled adjusting operators contained in the basic data base 31 and the knowledge data base 32.

Here, in case the series of the search processes are to be commenced, it is on the premise that no combustion fluctuation arises as mentioned in the Condition 2. Hence, if the judgement is made such that there is a deviation from the administrative value or there is a prior symptom of the combustion fluctuation as the result of the comparison with the threshold in the Step S206, it is just after the operation condition is changed, that is, in the second or subsequent cycles. Thus, even if the maintenance of the combustion stability becomes hard as the result of varying the operation condition for searching the optimal operation condition, the fluctuation can be appropriately corrected.

On the other hand, as the result of the comparison with the threshold, if there is no deviation from the administrative value and also there is no prior symptom of the combustion fluctuation, the stop command input portion 43 first confirms that there is no input for stopping the search process from outside and then judges whether the Conditions 1 to 4 for carrying out the search are still satisfied or not (Steps S207 and S208). Especially, however may be the first cycle in which the process has been commenced with the Conditions 1 to 4 being satisfied, for the second or subsequent cycles in which the condition has been varied, the confirmation of the Step S208 is necessary.

In case where the stop command input portion 43 confirms that there is an input of the command for stopping the search process from outside, if the operation condition has been already varied, in order to return the operation condition to the operation condition before the commencement of the variation (the standard operation point), the output portion 24 puts out the data of the correction quantity to the control unit 10 (Steps S209 and S212). The command for stopping the search process is inputted, for example, at the time when the load variation or fuel change-over is carried out or the stop process of the gas turbine system 1 is carried out. The command for stopping the search process not only stops to vary the operation condition but also returns the operation condition to the operation condition before the commencement of the variation.

Also, if the Conditions 1 to 4 are not satisfied in the Step S208, the step is returned to the Step S201 and unless the Conditions 1 to 4 are satisfied, search of the condition of the Step S210 and the subsequent steps are not proceeded.

If there is no input of the command for stopping the search process from outside and yet the Conditions 1 to 4 for carrying out the search are satisfied, the command input portion 43 confirms whether the search of a predetermined area has been completed or not. In order to continue the search unless the search is completed, the correction quantity calculating portion 40 decides the operation condition to be changed (this is called a trial point) (Step S211) and the output portion 24 puts out the data of the correction quantity corresponding to the operation condition.

Figure 15:
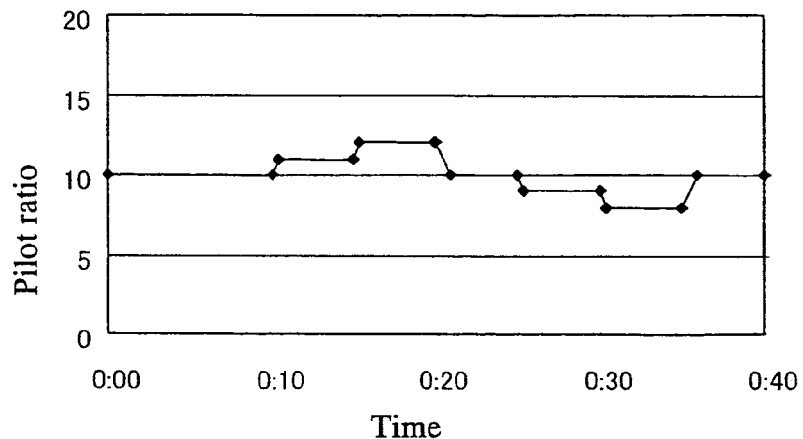
Figure 15:
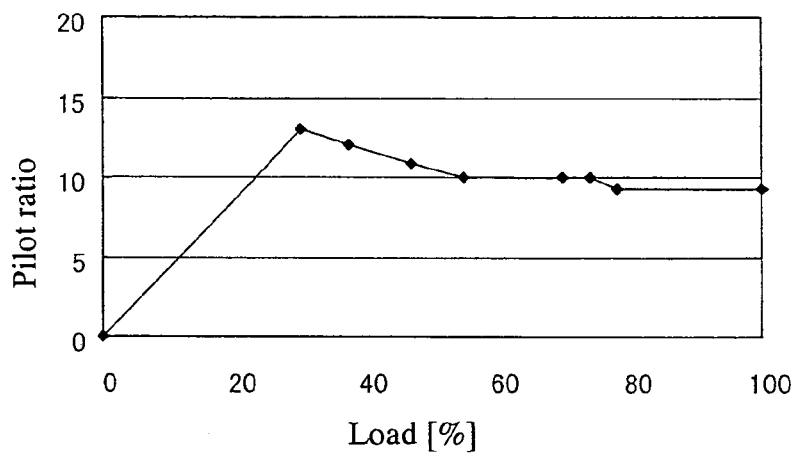
Figure 15:
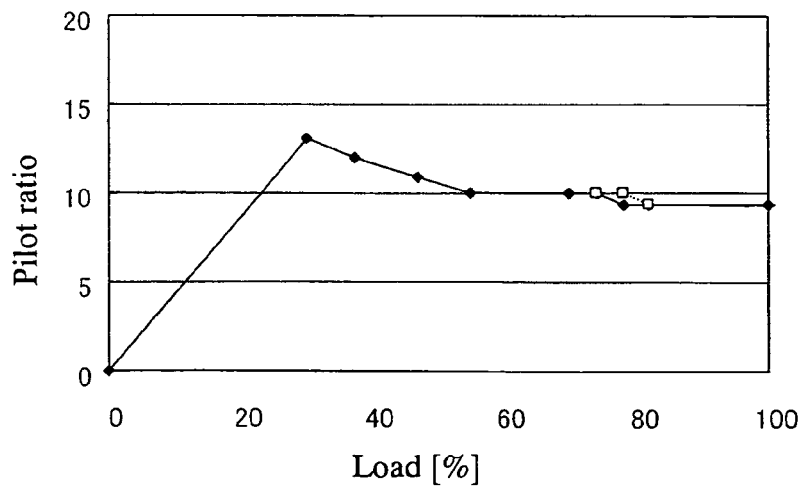

At this time, the steps of FIG. 13 are repeated with a plurality of cycles and the trial point decided in the Step S211 is varied. Thereby, each of the parameters of the operation condition is sequentially varied in a predetermined area. Concretely, at least one of the flow rates of fuel and air to be supplied into the combustor 111 is varied on each time with a predetermined quantity. For this purpose, as shown in FIG. 15(a), for example, as time passes, based on the sequence to vary the pilot ratio in the upper and lower plural stages, the output portion 24 puts out the correction quantity for controlling the main fuel flow control valve 113, the pilot fuel flow control valve 114, the by-pass valve 118 and the inlet guide vane 102. Other than this also, the opening of the by-pass valve 118, etc. are varied as time passes. Thus, by repeating the steps of FIG. 13 with predetermined cycles, the operation conditions of the gas turbine system 1 are allotted in the predetermined areas and thereby the search of the condition can be carried out. It is to be noted that, in FIG. 16(a), while the operation condition is varied in the horizontal and vertical directions on the two-dimensional plane of the by-pass valve opening and the pilot ratio, variation of the operation condition is not limited to the horizontal and vertical directions but both of the by-pass valve opening and the pilot ratio may be varied at the same time or the search running on the boundary line of the condition search areas may be done. Also, while the by-pass valve opening and the pilot ratio are mentioned as the control factor, the control factor is not limited thereto.

Also, when the trial point is to be decided in the Step S211, the correction quantity calculating portion 40 may put out a correction quantity so that the combustion fluctuation level after varying the operation condition is predicted before the actual correction quantity is put out and, as the result thereof, only after the judgement is so made that a stable combustion can be maintained, the correction quantity may be put out. For this purpose, the operation condition is likewise varied based on the past data and the experiential information stored in the data base 30 and the knowledge data base 32 and, according to the result thereof, the prediction is carried out.

Thereby, while the operation condition is being searched, a possibility that the combustion fluctuation level deviates from the threshold can be reduced.

When the correction quantity is put out from the output portion 24, on each time when the operation condition varies, the process data as the result of varying the operation condition is stored in the data base 30 in the Step S210. In the Step S210, at the time when the judgement is so made that the search of predetermined areas has been completed, an optimal operation condition (optimal point) is decided (Step S213).

For this purpose, at the time of completion of the search, the optimal point (optimal operation condition) is decided out of the data of each of the trial points stored in the data base 30. The optimal operation condition may be one having the highest combustion stability or, in addition to this, the thermal efficiency or the efficiency of each element of the gas turbine system 1 may be taken into consideration so that the optimal operation condition is decided. Also, the environment preserving ability may be taken into consideration. If the gas turbine system 1 is a portion of the construction of a combined cycle power generating system (a gas turbine combined cycle plant), a plant efficiency of the combined cycle power generating system may be taken into consideration. Further, the optimal point is not only decided in the data of each of the trial points but also may be another point in the condition search area that is assessed most optimal by the result of each of the trial points being applied with a non-linear multiple regression equation or a multiple item equation, for example.

In this way, the initial operation condition, as shown in FIG. 15(b), for example, can be changed to such an operation condition as shown in FIG. 15(c).

By the way, while the operation condition is varied from the steady state in the stable area so that the optimal operation condition is found out, as mentioned above, even in the stage before that, an operation schedule showing a referential operation condition, as shown in FIG. 15(b), is necessary.

Figure 17:
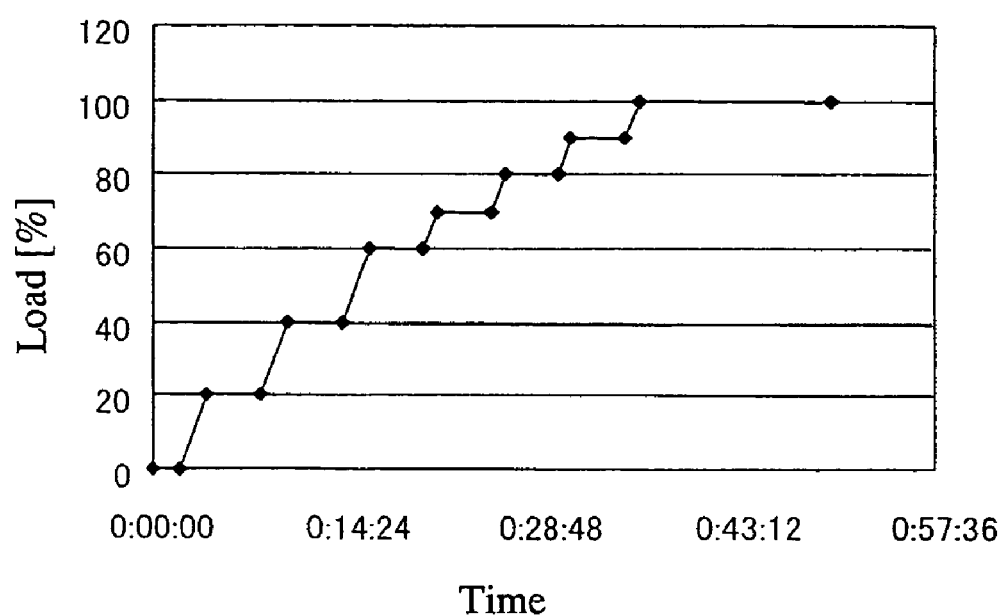
FIG. 17 is a view showing a load increase schedule for setting an initial operation condition.

Needless to mention, this can be set by a calculation, simulation or the like at the design stage. But the operation schedule showing the referential operation condition can be also generated such that, at the time of trial operation of the gas turbine system 1, the load is changed step-wise, as shown in FIG. 17, the operation condition is varied in plural steps in each of the steps of the load, as shown in FIG. 15(a), the operation condition of the highest evaluation is decided in each of the steps of the load and the so decided operation conditions are connected one to another.

While the above description is of the control when the load is almost in the steady state, as to the time of start or stop of the gas turbine also, the operation condition can be automatically changed. For this purpose, as shown in FIG. 12, a schedule planning portion 44 is provided in the automatic adjusting portion 20 and, based on this, schedules of different operation conditions are used on each time of the start or stop. Thus, by carrying out the start or stop in plural times, data of the different operation conditions are stored and, based on this, an optimal operation condition at the time of the start or stop can be set.

Figure 18:
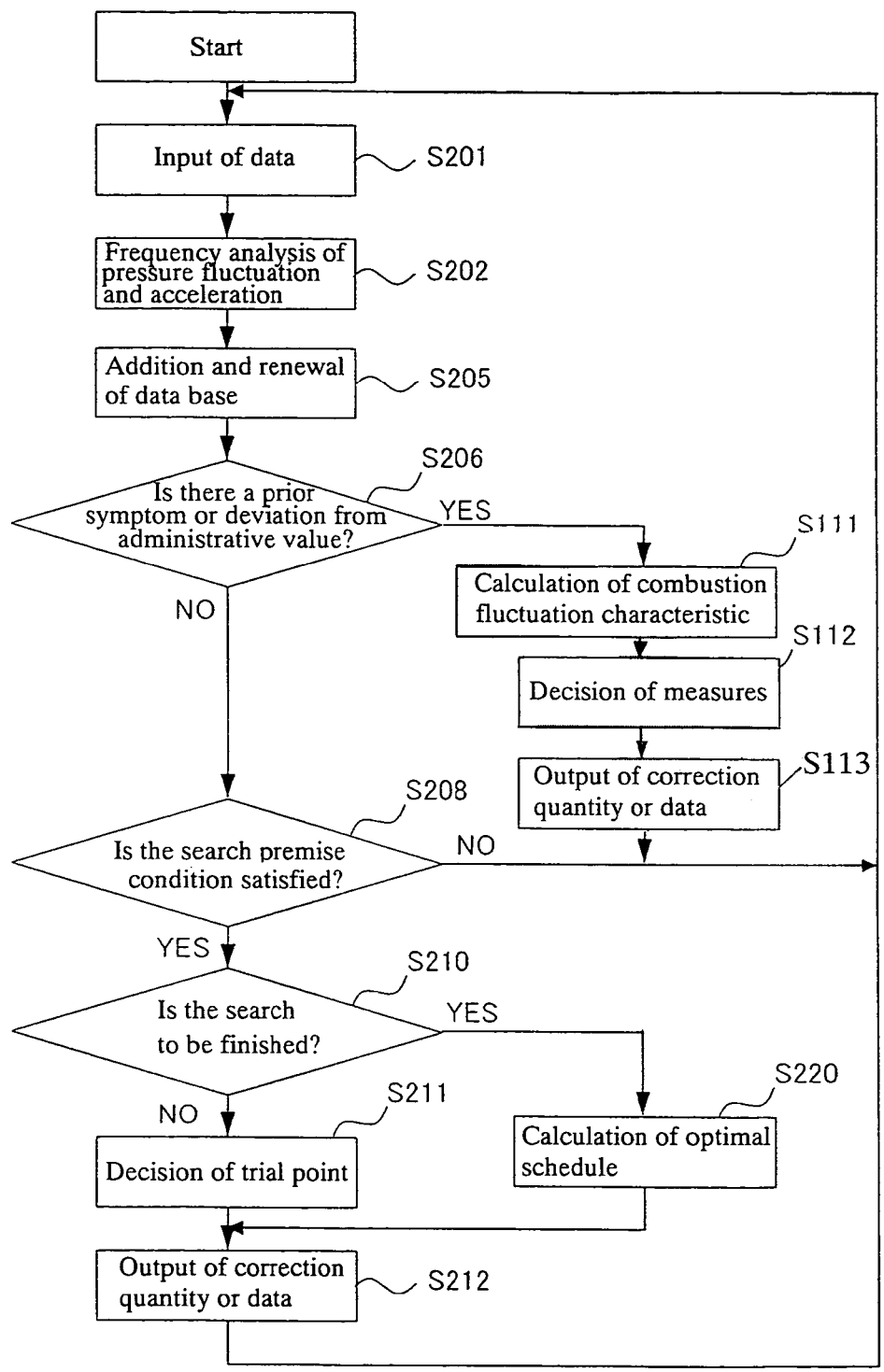
FIG. 18 is a view showing a flow of processing for searching an optimal operation schedule at the time of start or stop.
Figure 19:
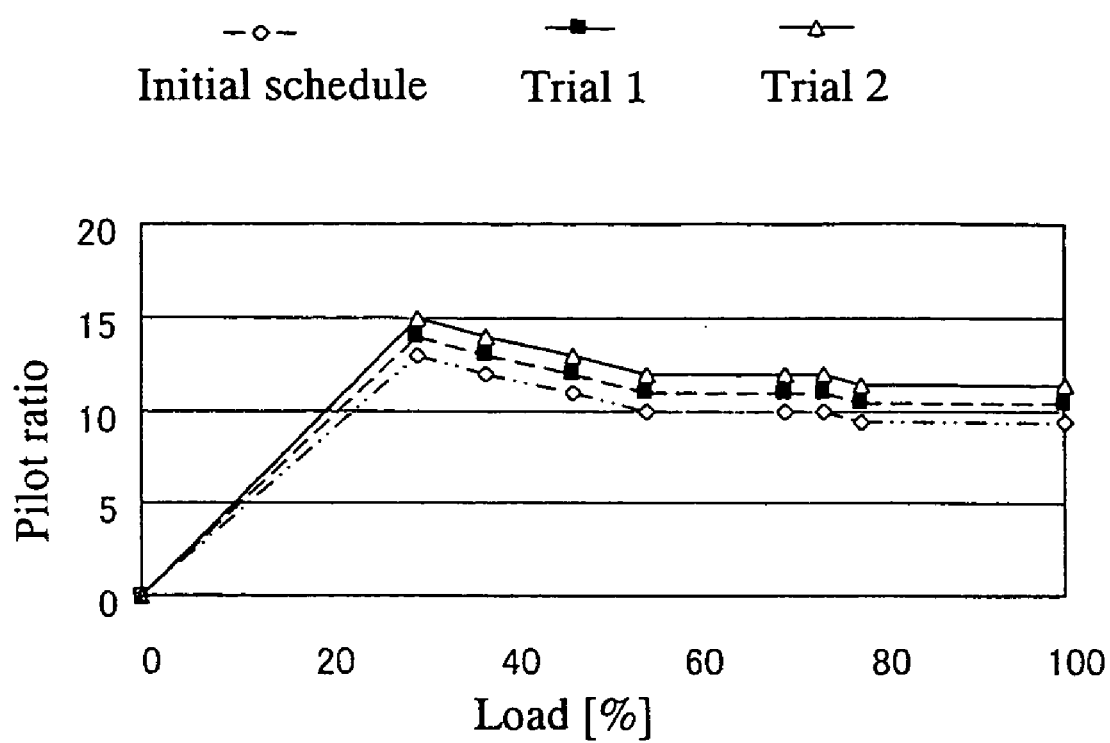
FIG. 19 is a view showing an example of the operation condition at the time of start or stop.

FIG. 18 is a view showing a flow of the condition search process for setting the optimal operation condition (operation schedule) at the time of the start or stop, as mentioned above. Here, the steps of the process same or similar to the steps of FIG. 13 are designated with the same reference numerals and description thereon will be omitted.

The condition search process shown in FIG. 18 is carried out on each time of carrying out the start or stop. On each time of the start or stop, a trial point is decided by the Step S211, the gas turbine system 1 is started or stopped on the operation condition of the trial point so decided and the process data of the operation condition at that time is stored in the data base 30. After the starts or stops of a predetermined number of times are carried out, the optimal operation condition (operation schedule) is calculated based on the data base 30 as so far stored.

Thus, in the stable state or at the time of start or stop also, a highly stabilized operation condition or a highly economical operation condition can be searched to be automatically obtained and thereby a stable and economical operation becomes possible.

Figure 16:
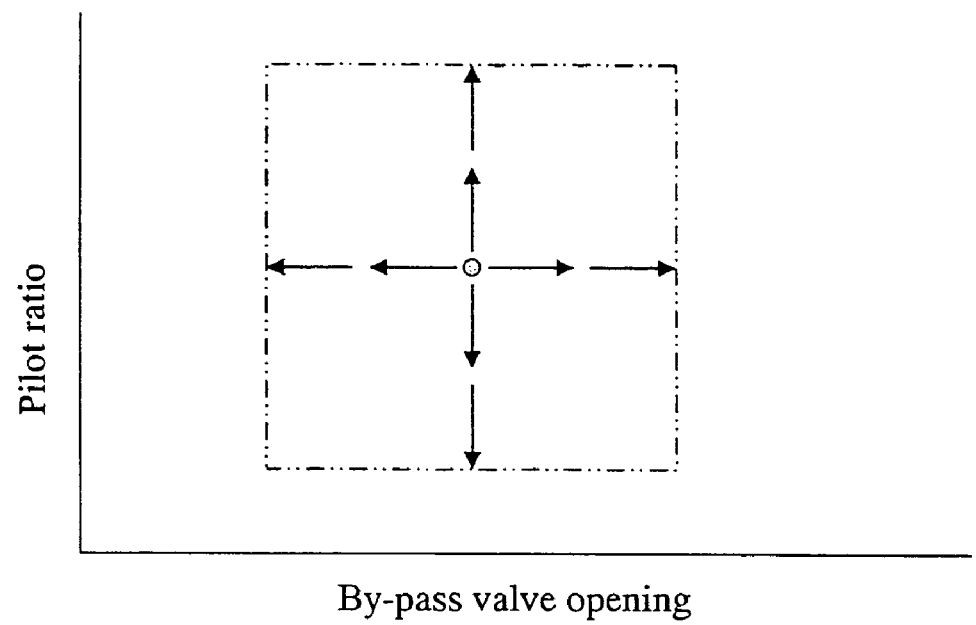
Figure 16:
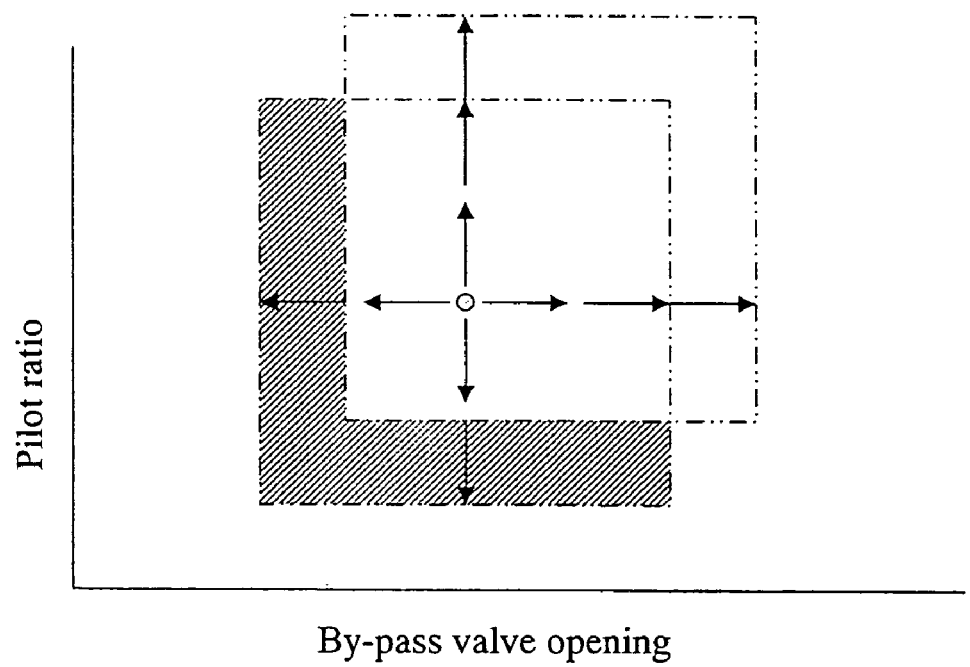

In the above-mentioned series of processes, if a prior symptom of the combustion fluctuation appears or there arises a deviation from the administrative value, the process to suppress the combustion fluctuation is carried out but, in addition to this, the range of the search of condition to be carried out thereafter may be slid as shown in FIG. 16(b). Thereby, there is obtained a possibility that a more optimal operation condition can be found out.

While various control factors have been mentioned in the above embodiments, other than this also, unless there is caused a deviation from the basis of the present invention, these control factors can be appropriately selected to be partly taken or abandoned or the construction can be appropriately changed to other constructions.

What is claimed is:

1. A gas turbine control apparatus comprising:
    a frequency analyzing portion carrying out a frequency analysis of fluctuation of pressure or acceleration in a combustor of a gas turbine and putting out an analysis result divided into frequency bands in which the result of said frequency analysis is divided into a plurality of frequency bands,
    a priority order information containing portion containing information on a priority order set for said plurality of frequency bands,
    a combustion characteristic grasping portion grasping a characteristic of combustion fluctuation of said gas turbine, based on said analysis result divided into frequency bands and process data of said gas turbine, and
    a control portion adjusting at least one of a flow rate of fuel and a flow rate of air to be supplied into said combustor so that the combustion fluctuation of a frequency band of a high priority order is suppressed, based on the information on said priority order contained in said priority order information containing portion, when said combustion characteristic grasping portion grasps that the combustion fluctuation arises in a plurality of frequency bands.

2. A gas turbine control apparatus as claimed in claim 1, wherein, when said control portion adjusts at least one of the flow rate of fuel and the flow rate of air to be supplied into said combustor, said control portion stores in a data base contents of the adjustment and information related with changes in a combustion state in said combustor as the result of the adjustment.

3. A gas turbine control apparatus as claimed in claim 2, wherein said gas turbine control apparatus further comprises a basic data base in which information obtained by an analysis based on said information stored in said data base in another gas turbine is contained and said control portion adjusts at least one of the flow rate of fuel and the flow rate of air to be supplied into said combustor, based on said information obtained by the analysis and contained in said basic data base.

4. A gas turbine control apparatus as claimed in claim 1, wherein said gas turbine control apparatus further comprises a turbine abnormality detecting portion detecting an abnormality of said gas turbine and, when said turbine abnormality detecting portion detects an abnormality of said gas turbine, said control portion carries out no adjustment but notifies outside that there arises an abnormality.

5. A gas turbine control apparatus as claimed in claim 1, wherein said gas turbine control apparatus further comprises a sensor detecting the fluctuation of pressure or acceleration in said combustor and a sensor abnormality detecting portion detecting an abnormality of said sensor and, when said sensor abnormality detecting portion detects an abnormality of said sensor, said control portion carries out no adjustment but notifies outside that there arises an abnormality.

6. A gas turbine control apparatus as claimed in claim 1, wherein said control portion corrects contents of the adjustment made for at least one of the flow rate of fuel and the flow rate of air to be supplied into said combustor, based on a composition of the fuel to be supplied into said combustor.

7. A gas turbine system comprising:
    a gas turbine containing a combustor,
    a frequency analyzing portion carrying out a frequency analysis of fluctuation of pressure or acceleration in said combustor and putting out an analysis result divided into frequency bands in which the result of said frequency analysis is divided into a plurality of frequency bands,
    a priority order information containing portion containing information on a priority order set for said plurality of frequency bands,
    a combustion characteristic grasping portion grasping a characteristic of combustion fluctuation of said gas turbine, based on said analysis result divided into frequency bands and process data of said gas turbine, and
    a control portion adjusting at least one of a flow rate of fuel and a flow rate of air to be supplied into said combustor so that the combustion fluctuation of a frequency band of a high priority order is suppressed, based on the information on said priority order contained in said priority order information containing portion, when said combustion characteristic grasping portion grasps that the combustion fluctuation arises in a plurality of frequency bands.

8. A gas turbine control method comprising:
    a step of carrying out a frequency analysis of fluctuation of pressure or acceleration in a combustor of a gas turbine and putting out an analysis result divided into frequency bands in which the result of said frequency analysis is divided into a plurality of frequency bands,
    a step of grasping a characteristic of combustion fluctuation of said gas turbine, based on said analysis result divided into frequency bands and process data of said gas turbine, and
    a step of adjusting at least one of a flow rate of fuel and a flow rate of air to be supplied into said combustor so that the combustion fluctuation of a frequency band of a high priority order is suppressed, based on a predetermined priority order, when the combustion fluctuation arises in a plurality of frequency bands.

9. A gas turbine control apparatus comprising:
a frequency analyzing portion carrying out a frequency analysis of fluctuation of pressure or acceleration in a combustor of a gas turbine and putting out an analysis result divided into frequency bands in which the result of said frequency analysis is divided into a plurality of frequency bands,
a combustion characteristic grasping portion grasping a characteristic of combustion fluctuation of said gas turbine, based on said analysis result divided into frequency bands and process data of said gas turbine,
a control portion adjusting at least one of a flow rate of fuel and a flow rate of air to be supplied into said combustor so that the combustion fluctuation is suppressed, when said combustion characteristic grasping portion grasps that the combustion fluctuation arises, and
a search and control portion searching an optimal operation condition by varying at least one of the flow rate of fuel and the flow rate of air to be supplied into said combustor in the state that said control portion is not carrying out an adjustment to suppress the combustion fluctuation and, corresponding to said optimal operation condition obtained, adjusting at least one of the flow rate of fuel and the flow rate of air to be supplied into said combustor.

10. A gas turbine control apparatus as claimed in claim 9, wherein said search and control portion decides said optimal operation condition as an operation condition in which a stability against the combustion fluctuation is highest.

11. A gas turbine control apparatus as claimed in claim 9, wherein said search and control portion searches said optimal operation condition by evaluating a thermal efficiency of said gas turbine in addition to the stability against the combustion fluctuation.

12. A gas turbine control apparatus as claimed in claim 9, wherein said search and control portion varies at least one of the flow rate of fuel and the flow rate of air to be supplied into said combustor based on a predetermined profile.

13. A gas turbine control apparatus as claimed in claim 12, wherein, when said search and control portion varies at least one of the flow rate of fuel and the flow rate of air to be supplied into said combustor based on said profile, said search and control portion predicts whether the combustion fluctuation may arise or not and, if it is so predicted that the combustion fluctuation may arise, said search and control portion stops to vary at least one of the flow rate of fuel and the flow rate of air to be supplied into said combustor.

14. A gas turbine control apparatus as claimed in claim 9, wherein, if the combustion fluctuation arises as the result of said search and control portion varying at least one of the flow rate of fuel and the flow rate of air to be supplied into said combustor, said search and control portion stops to vary at least one of the flow rate of fuel and the flow rate of air to be supplied into said combustor.

15. A gas turbine control apparatus as claimed in claim 14, wherein, if the combustion fluctuation arises as the result of said search and control portion varying at least one of the flow rate of fuel and the flow rate of air to be supplied into said combustor, said control portion adjusts at least one of the flow rate of fuel and the flow rate of air to be supplied into said combustor so that the combustion fluctuation is suppressed.

16. A gas turbine system comprising:
a gas turbine containing a combustor and
a search and control portion searching an optimal operation condition by varying at least one of a flow rate of fuel and a flow rate of air to be supplied into said combustor in the state that there is no combustion fluctuation in said gas turbine and, corresponding to said optimal operation condition obtained, adjusting at least one of the flow rate of fuel and the flow rate of air to be supplied into said combustor.

17. A gas turbine system as claimed in claim 16, wherein said search and control portion searches an optimal operation condition at the time of start or stop of said gas turbine by varying at least one of the flow rate of fuel and the flow rate of air to be supplied into said combustor on each time of the start or stop of said gas turbine as well as by carrying out the start or stop with a plurality of times.

18. A gas turbine control method comprising:
a result putting out step carrying out a frequency analysis of fluctuation of pressure or acceleration in a combustor of a gas turbine and putting out an analysis result thereof,
a characteristic grasping step grasping a characteristic of combustion fluctuation of said gas turbine, based on said analysis result and process data of said gas turbine,
a fluctuation suppressing step adjusting at least one of a flow rate of fuel and a flow rate of air to be supplied into said combustor so that the combustion fluctuation is suppressed, if the combustion fluctuation arises as the result of said characteristic grasping step grasping the characteristic of the combustion fluctuation of said gas turbine, and
a condition searching step searching an optimal operation condition by varying at least one of the flow rate of fuel and the flow rate of air to be supplied into said combustor in the state that said fluctuation suppressing step is not being carried out and, corresponding to said optimal operation condition obtained, adjusting at least one of the flow rate of fuel and the flow rate of air to be supplied into said combustor.

* * * * *